(12) United States Patent
Shichida et al.

(10) Patent No.: US 11,233,250 B2
(45) Date of Patent: Jan. 25, 2022

(54) ELECTROCHEMICAL REACTION UNIT INCLUDING CATHODE-SIDE FRAME CONFIGURED TO IMPROVE SPREADING OF OXIDANT GAS AND ELECTROCHEMICAL REACTION CELL STACK

(71) Applicant: MORIMURA SOFC TECHNOLOGY CO., LTD., Komaki (JP)

(72) Inventors: Takafumi Shichida, Nagoya (JP); Yuki Ota, Nagoya (JP)

(73) Assignee: MORIMURA SOFC TECHNOLOGY CO., LTD., Komaki (JP)

( * ) Notice: Subject to any disclaimer, the term of this patent is extended or adjusted under 35 U.S.C. 154(b) by 28 days.

(21) Appl. No.: 16/482,453

(22) PCT Filed: Dec. 7, 2017

(86) PCT No.: PCT/JP2017/043956
§ 371 (c)(1),
(2) Date: Jul. 31, 2019

(87) PCT Pub. No.: WO2018/142759
PCT Pub. Date: Aug. 9, 2018

(65) Prior Publication Data
US 2020/0006788 A1  Jan. 2, 2020

(30) Foreign Application Priority Data

Feb. 2, 2017 (JP) .............................. JP2017-017211

(51) Int. Cl.
*H01M 8/0258* (2016.01)
*H01M 8/1231* (2016.01)
(Continued)

(52) U.S. Cl.
CPC ...... *H01M 8/0258* (2013.01); *H01M 8/04201* (2013.01); *H01M 8/04753* (2013.01);
(Continued)

(58) Field of Classification Search
CPC ............. H01M 8/0258; H01M 8/1231; H01M 8/2483; H01M 8/04201; H01M 8/04753; H01M 8/04761; H01M 8/2425
(Continued)

(56) References Cited

U.S. PATENT DOCUMENTS

2003/0087140 A1* 5/2003 Kikuchi .............. H01M 8/0267
429/434
2005/0014059 A1 1/2005 Kaye
(Continued)

FOREIGN PATENT DOCUMENTS

JP 2003-086204 A 3/2003

OTHER PUBLICATIONS

"Group." Merriam-Webster.com Dictionary, Merriam-Webster, https://www.merriam-webster.com/dictionary/group. Accessed May 26, 2021. (Year: 2021).*
(Continued)

*Primary Examiner* — Sean P Cullen
(74) *Attorney, Agent, or Firm* — Sughrue Mion, PLLC

(57) ABSTRACT

An electrochemical reaction unit including a unit cell, a cathode-side member, and an anode-side member. The sum La of the distance Lai between a virtual straight line representing a center position of the unit cell and the midpoint between opposite end points of a cathode-side supply opening group and the distance Lao between the virtual straight line and the midpoint between opposite end points of a cathode-side discharge opening group is smaller than the sum Lf of the distance Lfi between the virtual straight line and the midpoint between opposite end points of an anode-
(Continued)

side supply opening group including an opening of an anode-side supply communication channel and the distance Lfo between the virtual straight line and the midpoint between opposite end points of an anode-side discharge opening group including an opening of an anode-side discharge communication channel.

4 Claims, 14 Drawing Sheets

(51) Int. Cl.
  *H01M 8/2483*  (2016.01)
  *H01M 8/04082*  (2016.01)
  *H01M 8/04746*  (2016.01)
  *H01M 8/2425*  (2016.01)
  *H01M 8/124*  (2016.01)

(52) U.S. Cl.
  CPC ..... *H01M 8/04761* (2013.01); *H01M 8/1231* (2016.02); *H01M 8/2425* (2013.01); *H01M 8/2483* (2016.02); *H01M 2008/1293* (2013.01)

(58) Field of Classification Search
  USPC .................................. 429/456, 457, 458, 514
  See application file for complete search history.

(56) References Cited

U.S. PATENT DOCUMENTS

2013/0337359 A1  12/2013  Sugiura
2014/0356759 A1  12/2014  Suzuki

OTHER PUBLICATIONS

Communication dated Dec. 1, 2020, from the European Patent Office in counterpart European Application No. 17895016.8.
International Search Report (PCT/ISA/210) dated Jan. 30, 2018 issued by the International Searching Authority in International Application No. PCT/JP2017/043956.

* cited by examiner

ELECTROCHEMICAL REACTION UNIT INCLUDING CATHODE-SIDE FRAME CONFIGURED TO IMPROVE SPREADING OF OXIDANT GAS AND ELECTROCHEMICAL REACTION CELL STACK

CROSS REFERENCE TO RELATED APPLICATIONS

This application is a National Stage of International Application No. PCT/JP2017/043956 filed Dec. 7, 2017, claiming priority based on Japanese Patent Application No. 2017-017211 filed Feb. 2, 2017.

TECHNICAL FIELD

A technique disclosed in the present description relates to an electrochemical reaction unit.

BACKGROUND ART

One known fuel cell that generates electricity by using an electrochemical reaction of hydrogen and oxygen is a solid oxide fuel cell (hereinafter referred to as an "SOFC"). A fuel cell electricity generation unit (hereinafter referred to as an "electricity generation unit"), which is a structural unit of an SOFC, includes a fuel cell unit cell (hereinafter referred to as a "unit cell"). The unit cell includes an electrolyte layer and further includes a cathode and an anode that face each other in a prescribed direction (hereinafter referred to a "first direction") with the electrolyte layer therebetween.

The electricity generation unit includes a cathode-side member (hereinafter referred to as a "cathode-side frame") having a cathode chamber hole that forms a cathode chamber to which the cathode is facing. A cathode-side gas supply channel hole and a cathode-side gas discharge channel hole are formed in the cathode-side frame. The cathode-side gas supply channel hole forms a cathode-side gas supply channel (hereinafter referred to as an "oxidant gas introduction manifold") through which gas to be supplied to the cathode chamber (the gas is hereinafter referred to as "oxidant gas") flows. The cathode-side gas discharge channel hole forms a cathode-side gas discharge channel (hereinafter referred to as an "oxidant gas discharge manifold") through which gas discharged from the cathode chamber (hereinafter referred to as "oxidant off-gas") flows. A cathode-side supply communication channel and a cathode-side discharge communication channel are further formed in the cathode-side frame. The cathode-side supply communication channel is in communication with the cathode-side gas supply channel hole and has an opening at an inner circumferential surface (hereinafter referred to as a "first inner circumferential surface") of the cathode chamber hole. The cathode-side discharge communication channel is in communication with the cathode-side gas discharge channel hole and has an opening at another inner circumferential surface (hereinafter referred to as a "second inner circumferential surface") of the cathode chamber hole that faces the first inner circumferential surface. The oxidant gas is supplied to the cathode chamber of the electricity generation unit through the oxidant gas introduction manifold and the cathode-side supply communication channel. The oxidant off-gas discharged from the cathode chamber is discharged to the outside through the cathode-side discharge communication channel and the oxidant gas discharge manifold.

Moreover, the electricity generation unit includes an anode-side member (hereinafter referred to as an "anode-side frame") having an anode chamber hole that forms an anode chamber to which the anode is facing. An anode-side gas supply channel hole and an anode-side gas discharge channel hole are formed in the anode-side frame. The anode-side gas supply channel hole forms an anode-side gas supply channel (hereinafter referred to as a "fuel gas introduction manifold") through which gas to be supplied to the anode chamber (hereinafter referred to as "fuel gas") flows. The anode-side gas discharge channel hole forms an anode-side gas discharge channel (hereinafter referred to as a "fuel gas discharge manifold") through which gas discharged from the anode chamber (hereinafter referred to as "fuel off-gas") flows. An anode-side supply communication channel and an anode-side discharge communication channel are further formed in the anode-side frame. The anode-side supply communication channel is in communication with the anode-side gas supply channel hole and has an opening at an inner circumferential surface (hereinafter referred to as a "third inner circumferential surface") of the anode chamber hole. The anode-side discharge communication channel is in communication with the anode-side gas discharge channel hole and has an opening at another inner circumferential surface (hereinafter referred to as a "fourth inner circumferential surface") of the anode chamber hole that faces the third inner circumferential surface. The fuel gas is supplied to the anode chamber of the electricity generation unit through the fuel gas introduction manifold and the anode-side supply communication channel. The fuel off-gas discharged from the anode chamber is discharged to the outside through the anode-side discharge communication channel and the fuel gas discharge manifold.

In a known SOFC structure, the facing direction of the first inner circumferential surface at which the cathode-side supply communication channel in the cathode-side frame has an opening and the second inner circumferential surface at which the cathode-side discharge communication channel has an opening is approximately the same as the facing direction of the third inner circumferential surface at which the anode-side supply communication channel in the anode-side frame has an opening and the fourth inner circumferential surface at which the anode-side discharge communication channel has an opening. In this structure, the main flow direction of the gas in the cathode chamber of each electricity generation unit is approximately opposite to the main flow direction of the gas in the anode chamber (the main flow directions of the two gases are opposite to each other). Alternatively, the main flow directions of the two gases are approximately the same. The SOFC structure in which the main flow directions of the two gases are approximately opposite to each other is referred to as a counter flow type structure, and the SOFC structure in which the main flow directions of the two gases are approximately the same is referred to as a co-flow type structure.

Generally, in an SOFC of the counter flow type or the co-flow type, cathode-chamber-side openings of the communication channels (the cathode-side supply communication channel and the cathode-side discharge communication channel) formed in the cathode-side frame and anode-chamber-side openings of the communication channels (the anode-side supply communication channel and the anode-side discharge communication channel) formed in the anode-side frame are arranged so as to be approximately symmetric with respect to a center position of the unit cell in a direction orthogonal to the direction of flow of the oxidant gas or the fuel gas (see, for example, Patent Document 1). Therefore, the cathode-chamber-side openings of the communication channels formed in the cathode-side frame and the anode-chamber-side openings of the communication channels formed in the anode-side frame are disposed at positions spaced certain distances from the center position of the unit cell.

PRIOR ART DOCUMENT

Patent Document

Patent Document 1: Japanese Patent Application Laid-Open (kokai) No. 2003-86204

SUMMARY OF THE INVENTION

Problems to be Solved by the Invention

The oxidant gas (e.g., air) has a larger average molecular weight than the fuel gas (e.g., hydrogen-rich gas), and therefore the diffusibility of the oxidant gas is low. In particular, since the SOFC is operated at relatively high temperature (e.g., 700° C. to 1,000° C.), the temperature of the oxidant gas is high. When the temperature of the oxidant gas is high, the viscosity of the oxidant gas tends to be higher than the viscosity of the fuel gas. Namely, in a high temperature environment, the oxidant gas is less likely to spread than the fuel gas. In the conventional SOFC, the cathode-chamber-side openings of the communication channels formed in the cathode-side frame and the anode-chamber-side openings of the communication channels formed in the anode-side frame are disposed at positions spaced certain distances from the center position of the unit cell. In this structure, the fuel gas flows and spreads well in plane directions, but the oxidant gas does not spread sufficiently in the plane directions. Therefore, a shortage of the oxidant gas may occur in some regions in the unit cell, causing a reduction in the electricity generation performance of the unit cell.

The above problem also occurs in an electrolysis cell unit, which is a structural unit of a solid oxide electrolysis cell (hereinafter referred to as an "SOEC") that generates hydrogen using electrolysis of water. In the present description, the fuel cell electricity generation unit and the electrolysis cell unit are collectively referred to as an electrochemical reaction unit.

The present description discloses a technique that can solve the above problem.

Means for Solving the Problems

The technique disclosed in the present description can be embodied, for example, in the following modes.

(1) An electrochemical reaction unit disclosed in the present description comprises:

a unit cell including an electrolyte layer containing a solid oxide and further including a cathode and an anode that face each other in a first direction with the electrolyte layer therebetween;

a cathode-side member having a cathode chamber hole that forms a cathode chamber to which the cathode is facing and that has a first inner circumferential surface and a second inner circumferential surface facing each other in a second direction orthogonal to the first direction, a cathode-side gas supply channel hole that forms a cathode-side gas supply channel through which gas to be supplied to the cathode chamber flows, a cathode-side gas discharge channel hole that forms a cathode-side gas discharge channel through which gas discharged from the cathode chamber flows, at least one cathode-side supply communication channel that is in communication with the cathode-side gas supply channel hole and has an opening at the first inner circumferential surface of the cathode chamber hole, and at least one cathode-side discharge communication channel that is in communication with the cathode-side gas discharge channel hole and has an opening at the second inner circumferential surface of the cathode chamber hole; and an anode-side member having an anode chamber hole that forms an anode chamber to which the anode is facing and that has a third inner circumferential surface and a fourth inner circumferential surface facing each other in the second direction, an anode-side gas supply channel hole that forms an anode-side gas supply channel through which gas to be supplied to the anode chamber flows, an anode-side gas discharge channel hole that forms an anode-side gas discharge channel through which gas discharged from the anode chamber flows, at least one anode-side supply communication channel that is in communication with the anode-side gas supply channel hole and has an opening at the third inner circumferential surface of the anode chamber hole, and at least one anode-side discharge communication channel that is in communication with the anode-side gas discharge channel hole and has an opening at the fourth inner circumferential surface of the anode chamber hole, wherein, in a view of the electrochemical reaction unit in the first direction, a sum La of a distance Lai between a virtual straight line connecting a midpoint of a first one of two sides of the unit cell that face each other in the second direction to a midpoint of a second one of the two sides of the unit cell and a midpoint between opposite end points of a cathode-side supply opening group including the opening of the at least one cathode-side supply communication channel at the first inner circumferential surface and a distance Lao between the virtual straight line and a midpoint between opposite end points of a cathode-side discharge opening group including the opening of the at least one cathode-side discharge communication channel at the second inner circumferential surface is smaller than a sum Lf of a distance Lfi between the virtual straight line and a midpoint between opposite end points of an anode-side supply opening group including the opening of the at least one anode-side supply communication channel at the third inner circumferential surface and a distance Lfo between the virtual straight line and a midpoint between opposite end points of an anode-side discharge opening group including the opening of the at least one anode-side discharge communication channel at the fourth inner circumferential surface. In this electrochemical reaction unit, the cathode-chamber-side openings of the communication channels (the cathode-side supply communication channel and the cathode-side discharge communication channel) formed in the cathode-side member are located closer to a center position of the unit cell in a direction orthogonal to the main flow direction (the second direction) of the gas supplied to the cathode chamber or the gas supplied to the anode chamber (the position of the virtual straight line) than the anode-chamber-side openings of the communication channels (the anode-side supply communication channel and the anode-side discharge communication channel) formed in the anode-side member. Therefore, in the electrochemical reaction unit, the gas supplied to the cathode chamber can spread well in plane directions, and a reduction in the performance of the unit cell caused by insufficient spreading of the gas can be prevented.

(2) The above-described electrochemical reaction unit may be configured such that, in the view of the electrochemical reaction unit in the first direction, a sum of an area of the cathode-side gas supply channel hole and an area of the cathode-side gas discharge channel hole is larger than a sum of an area of the anode-side gas supply channel hole and an area of the anode-side gas discharge channel hole. In this electrochemical reaction unit, while the area of the anode-side gas supply channel hole and the area of the anode-side gas discharge channel hole are not increased, the area of the cathode-side gas supply channel hole and the area of the cathode-side gas discharge channel hole can be increased. This prevents an increase in the size of the electricity generation unit. Therefore, the device can be reduced in size, and its startability can be improved. Moreover, pressure drop in the channels on the cathode side can be reduced, and a reduction in the efficiency of the electricity generation unit can be prevented.

(3) The above-described electrochemical reaction unit may be configured such that, in the view of the electrochemical reaction unit in the first direction, a sum of a total opening width of the cathode-side supply opening group and a total opening width of the cathode-side discharge opening group is larger than a sum of a total opening width of the anode-side supply opening group and a total opening width of the anode-side discharge opening group, and such that, in the view of the electrochemical reaction unit in the first direction, when a length of the unit cell on a second virtual straight line orthogonal to the virtual straight line and passing through a center of the unit cell is defined as a reference length Lc, a value obtained by dividing a difference between the sum La and the sum Lf by the reference length Lc, ((La−Lf)/Lc), is from −0.45 to 0 inclusive.

In this electrochemical reaction unit, the ratio representing the relative positional relation between the opening groups relative to the center position of the unit cell (the position of the virtual straight line), i.e., the value obtained by dividing the difference between the sum La and the sum Lf by the reference length Lc, (La−Lf)/Lc, is from −0.45 to 0 inclusive. In this case, the gas supplied to the cathode chamber can further spread in the plane directions, and the reduction in the performance of the unit cell caused by insufficient spreading of the gas can be further prevented.

(4) In the above-described electrochemical reaction unit, the unit cell may be a fuel cell unit cell. In this electrochemical reaction unit, the reduction in the electricity generation performance of the unit cell caused by insufficient spreading of an oxidant gas in the cathode chamber can be effectively prevented.

The technique disclosed in the present description can be embodied in various forms. For example, the technique can be embodied in the form of an electrochemical reaction unit (a fuel cell electricity generation unit or an electrolysis cell unit), in the form of an electrochemical reaction cell stack (a fuel cell stack or an electrolysis cell stack) including a plurality of electrochemical reaction units, and in the form of a method for producing them.

MODES FOR CARRYING OUT THE INVENTION

A. Embodiment

A-1. Apparatus Structure:
(Structure of Fuel Cell Stack 100)

Figure 1:
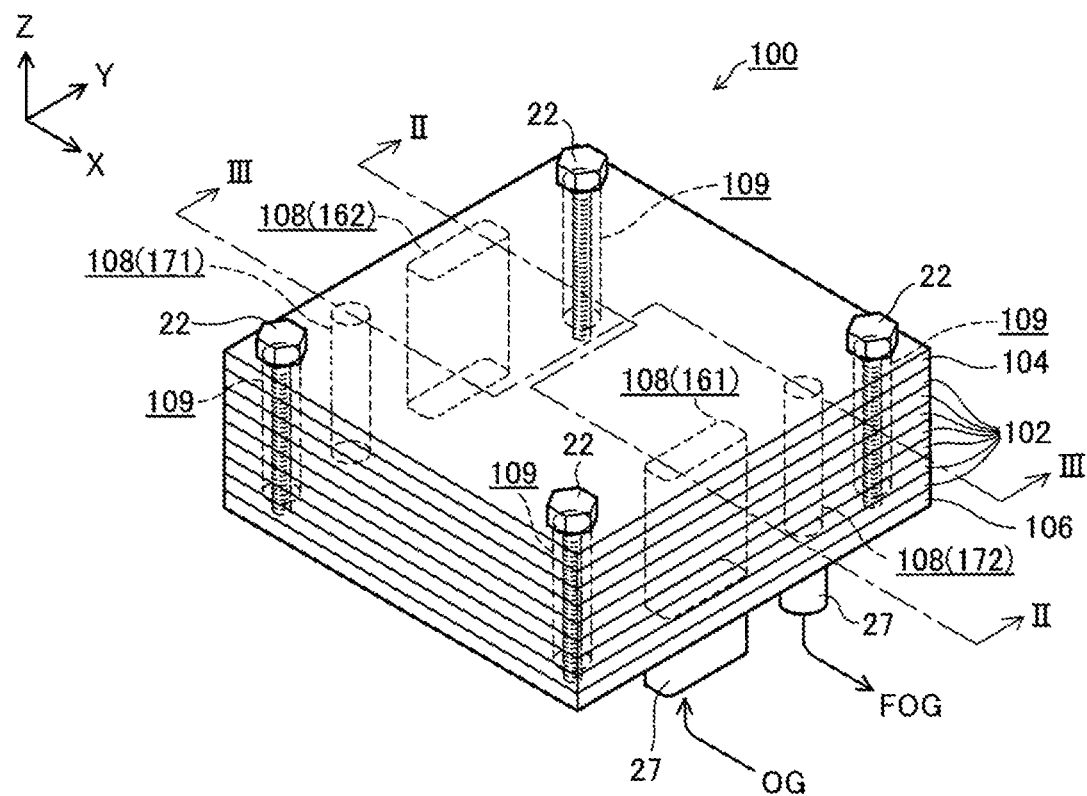
FIG. 1 is a perspective view showing an external structure of a fuel cell stack 100 of an embodiment.
Figure 2:
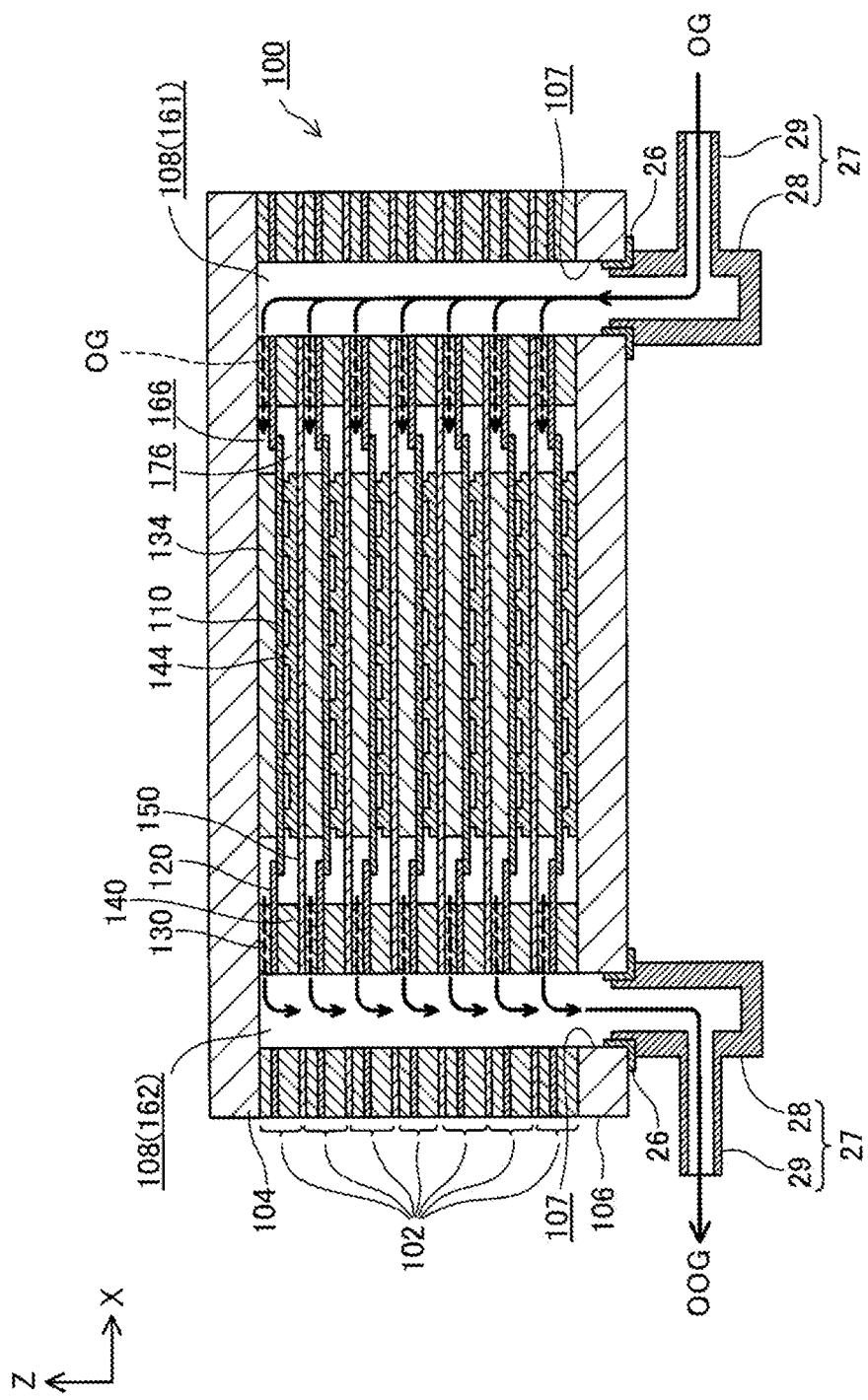
FIG. 2 is an explanatory view showing an XZ cross-sectional structure of the fuel cell stack 100 at a position indicated by II-II in FIG. 1.
Figure 3:
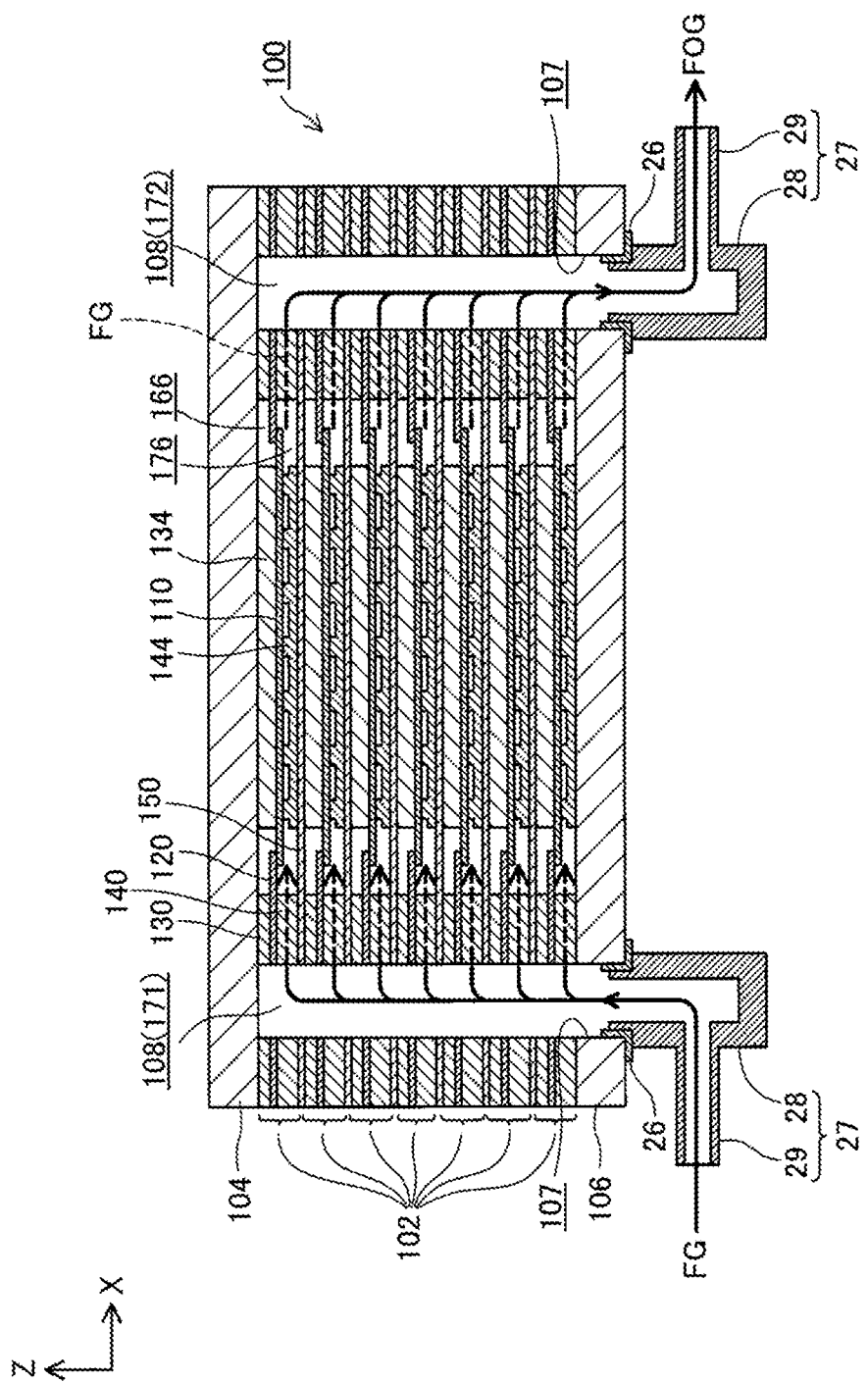
FIG. 3 is an explanatory view showing an XZ cross-sectional structure of the fuel cell stack 100 at a position indicated by III-III in FIG. 1.

FIG. 1 is a perspective view showing an external structure of a fuel cell stack 100 of an embodiment. FIG. 2 is an explanatory view showing an XZ cross-sectional structure of the fuel cell stack 100 at a position indicated by II-II in FIG. 1 (and FIGS. 6 and 7 described later), and FIG. 3 is an explanatory view showing an XZ cross-sectional structure of the fuel cell stack 100 at a position indicated by III-III in FIG. 1 (and FIGS. 6 and 7 described later). Mutually orthogonal X, Y, and Z axes for designating directions are shown in these figures. In the present description, a positive Z-axis direction is referred to as an upward direction, and a negative Z-axis direction is referred to as a downward direction, for the sake of convenience. However, in practice, the fuel cell stack 100 may be oriented differently. The same applies to FIG. 4 and subsequent figures. In the present description, directions orthogonal to the Z-axis direction are referred to as plane directions.

The fuel cell stack 100 includes a plurality of (seven in the present embodiment) fuel cell electricity generation units (hereinafter referred to simply as "electricity generation units") 102 and a pair of end plates 104 and 106. The seven electricity generation units 102 are arranged in a prescribed arrangement direction (the vertical direction in the present embodiment). The pair of end plates 104 and 106 are disposed so as to sandwich the assembly of the seven electricity generation units 102 in the vertically direction. The arrangement direction (the vertical direction) corresponds to the first direction in the claims.

As shown in FIG. 1, each of the layers (the electricity generation units 102 and the end plates 104 and 106) forming the fuel cell stack 100 has holes which are formed near four peripheral corners thereof about the Z-axis direction and extend therethrough in the vertical direction. A series of holes formed in these layers and aligned with one another are in communication with one another in the vertical direction and form one of bolt holes 109 that extends in the vertical direction from the end plate 104 to the end plate 106. Bolts 22 are inserted into the bolt holes 109, and the fuel cell stack 100 is clamped with the bolts 22 and unillustrated nuts.

As shown in FIGS. 1 to 3, each electricity generation unit 102 has holes which are formed near peripheral sides about the Z-axis direction and extend therethrough in the vertical direction. A series of holes formed in the electricity generation units 102 and aligned with one another are in communication with one another in the vertical direction and form one of communication holes 108 extending across the plurality of electricity generation units 102 in the vertical direction. In the following description, the holes formed in the electricity generation units 102 to form the communication holes 108 may also be referred to as the communication holes 108.

As shown in FIGS. 1 and 2, a communication hole 108 located near one of the peripheral sides of the fuel cell stack 100 about the Z-axis direction (one of two peripheral sides parallel to the Y-axis that is on the positive side in the X-axis direction) serves as an oxidant gas introduction manifold 161 that is a common gas channel into which oxidant gas OG is introduced from the outside of the fuel cell stack 100 and from which the oxidant gas OG is supplied to a cathode chamber 166, described later, of each electricity generation unit 102. A communication hole 108 located near the peripheral side opposite to the above peripheral side (one of the two peripheral sides parallel to the Y-axis that is on the negative side in the X-axis direction) serves as an oxidant gas discharge manifold 162 that is a common gas channel for discharging oxidant off-gas OOG, i.e., gas discharged from the cathode chamber 166 of each electricity generation unit 102, to the outside of the fuel cell stack 100. The fuel cell stack 100 in the present embodiment includes only one oxidant gas introduction manifold 161 and only one oxidant gas discharge manifold 162. In the present embodiment, air, for example, is used as the oxidant gas OG. The oxidant gas introduction manifold 161 corresponds to the cathode-side gas supply channel in the claims, and the oxidant gas discharge manifold 162 corresponds to the cathode-side gas discharge channel in the claims.

As shown in FIGS. 1 and 3, another communication hole 108—located near a side which is selected from the peripheral sides of the fuel cell stack 100 about the Z-axis direction and which is closest to the communication hole 108 serving as the oxidant gas discharge manifold 162—serves as a fuel gas introduction manifold 171 that is a common gas channel into which fuel gas FG is introduced from the outside of the fuel cell stack 100 and from which the fuel gas FG is supplied to an anode chamber 176, described later, of each electricity generation unit 102. Another communication hole 108—located near a side which is closest to the communication hole 108 serving as the oxidant gas introduction manifold 161—serves as a fuel gas discharge manifold 172 that is a common gas channel for discharging fuel off-gas FOG, i.e., gas discharged from the anode chamber 176 of each electricity generation unit 102, to the outside of the fuel cell stack 100. The fuel cell stack 100 in the present embodiment includes only one fuel gas introduction manifold 171 and only one fuel gas discharge manifold 172. In the present embodiment, the fuel gas FG used is, for example, hydrogen-rich gas reformed from city gas. The fuel gas introduction manifold 171 corresponds to the anode-side gas supply channel in the claims, and the fuel gas discharge manifold 172 corresponds to the anode-side gas discharge channel in the claims.

(Structures of End Plates 104 and 106)

The pair of end plates 104 and 106 are approximately rectangular plate-shaped conductive members and made of, for example, stainless steel. The end plate 104 is disposed on the upper side of the uppermost electricity generation unit 102, and the end plate 106 is disposed on the lower side of the lowermost electricity generation unit 102. The plurality of electricity generation units 102 are pressed and held between the pair of end plates 104 and 106. The upper end plate 104 functions as a positive output terminal of the fuel cell stack 100, and the lower end plate 106 functions as a negative output terminal of the fuel cell stack 100. As shown in FIGS. 2 and 3, four channel through holes 107 are formed in the lower end plate 106. Each of the four channel through holes 107 is in communication with a corresponding one of the oxidant gas introduction manifold 161, the oxidant gas discharge manifold 162, the fuel gas introduction manifold 171, and the fuel gas discharge manifold 172.

(Structures of Gas Passage Members 27 Etc.)

As shown in FIGS. 2 and 3, the fuel cell stack 100 further includes four gas passage members 27 disposed on the lower end plate 106 on the side opposite to the plurality of electricity generation units 102 (i.e., on the lower side). Each of the four gas passage members 27 is disposed in a position overlapping a corresponding one of the oxidant gas introduction manifold 161, the oxidant gas discharge manifold 162, the fuel gas introduction manifold 171, and the fuel gas discharge manifold 172 in the vertical direction. Each of the gas passage members 27 includes: a main body 28 having a hole in communication with a corresponding one of the channel through holes 107 of the lower end plate 106; and a tubular branched portion 29 branched from a side surface of the main body 28. The hole of the branched portion 29 is in communication with the hole of the main body 28. Gas pipes (not shown) are connected to the branched portions 29 of the gas passage members 27. An insulating sheet 26 is disposed between the end plate 106 and the main body 28 of each gas passage member 27. The insulating sheet 26 is formed of, for example, a mica sheet, a ceramic fiber sheet, a ceramic compact sheet, a glass sheet, or a glass-ceramic composite material.

(Structure of Electricity Generation Units 102)

Figure 4:
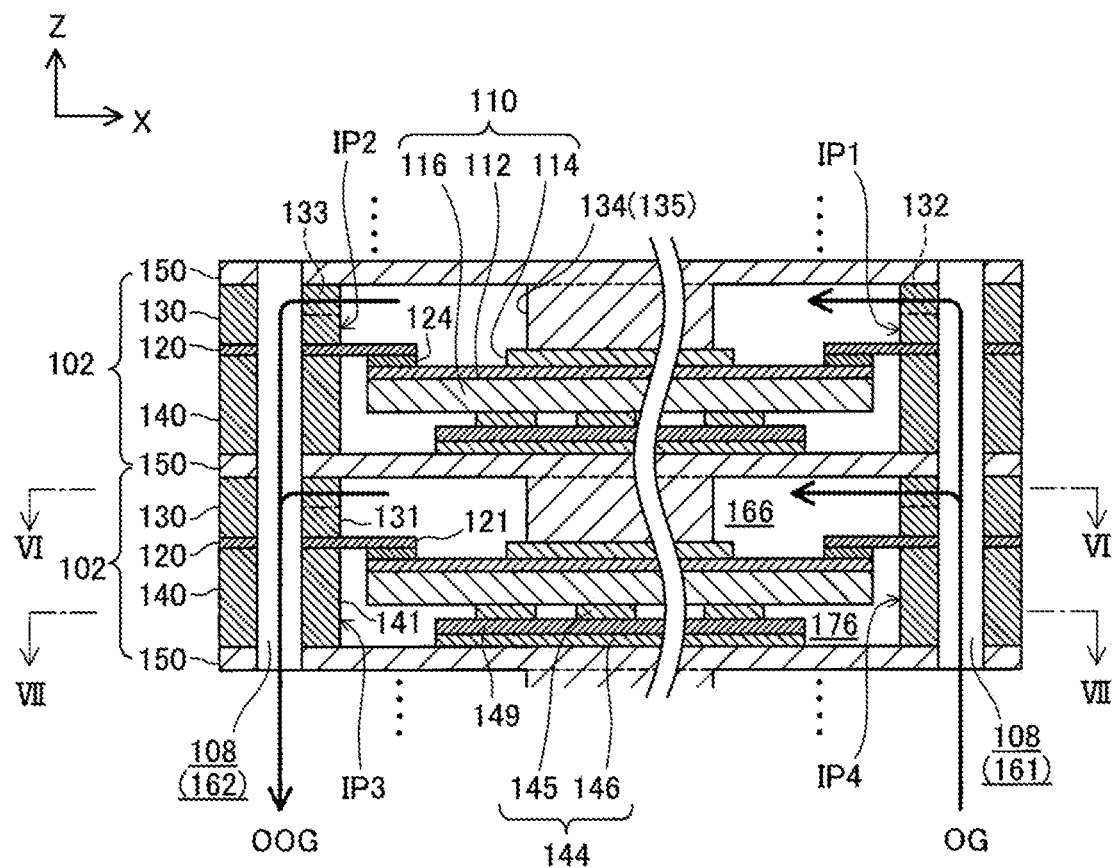
FIG. 4 is an explanatory view showing an XZ cross-sectional structure of two adjacent electricity generation units 102 at the same position as the cross section shown in FIG. 2.
Figure 5:
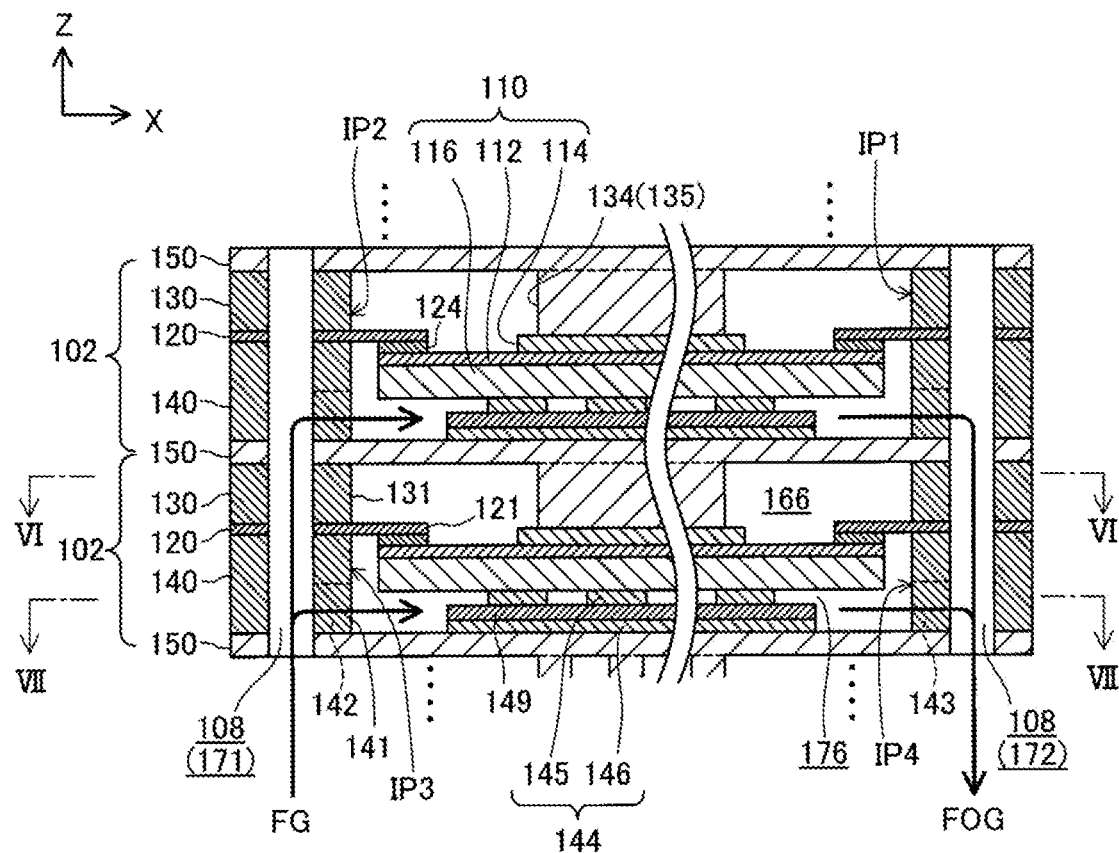
FIG. 5 is an explanatory view showing an XZ cross-sectional structure of two adjacent electricity generation units 102 at the same position as the cross section shown in FIG. 3.
Figure 6:
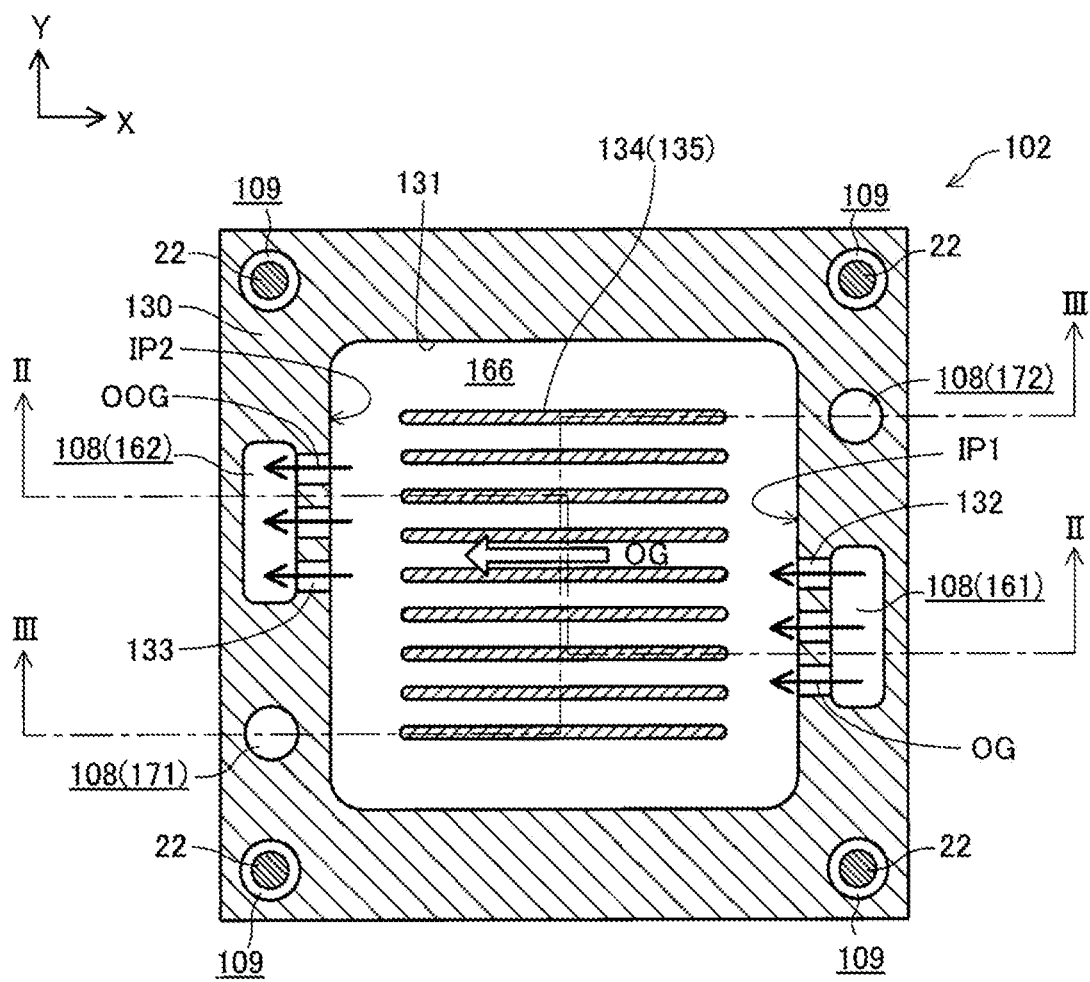
FIG. 6 is an explanatory view showing an XY cross-sectional structure of an electricity generation unit 102 at a position indicated by VI-VI in FIGS. 4 and 5.
Figure 7:
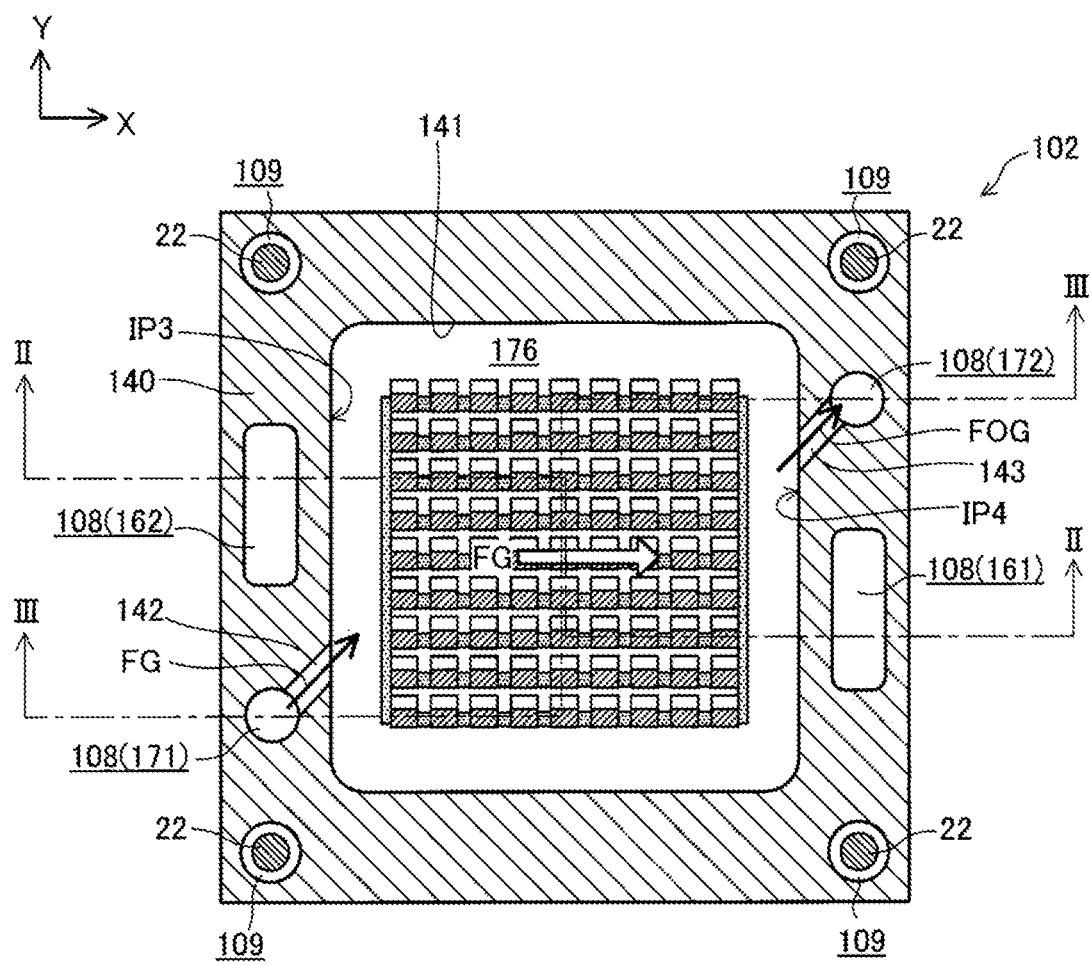
FIG. 7 is an explanatory view showing an XY cross-sectional structure of the electricity generation unit 102 at a position indicated by VII-VII in FIGS. 4 and 5.

FIG. 4 is an explanatory view showing an XZ cross-sectional structure of two adjacent electricity generation units 102 at the same position as the cross section shown in FIG. 2, and FIG. 5 is an explanatory view showing an XZ cross-sectional structure of two adjacent electricity generation units 102 at the same position as the cross section shown in FIG. 3. FIG. 6 is an explanatory view showing an XY cross-sectional structure of an electricity generation unit 102 at a position indicated by VI-VI in FIGS. 4 and 5, and FIG. 7 is an explanatory view showing an XY cross-sectional structure of the electricity generation unit 102 at a position indicated by VII-VII in FIGS. 4 and 5.

As shown in FIGS. 4 and 5, each electricity generation unit 102 includes a unit cell 110, a separator 120, a cathode-side frame 130, a cathode-side current collector 134, an anode-side frame 140, an anode-side current collector 144, and a pair of interconnectors 150 serving as the uppermost and lowermost layers of the electricity generation unit 102. Holes constituting the communication holes 108 serving as the manifolds 161, 162, 171, and 172 and holes constituting the bolt holes 109 are formed in a peripheral edge portion, about the Z-axis direction, of each of the separator 120, the cathode-side frame 130, the anode-side frame 140, and the interconnectors 150.

Each interconnector 150 is an approximately rectangular flat plate-shaped conductive member and is formed of, for example, ferritic stainless steel. The interconnector 150 provides electrical continuity between adjacent electricity generation units 102 and prevents mixing of reaction gases in adjacent electricity generation units 102. In the present embodiment, when two electricity generation units 102 are disposed adjacent to each other, the electricity generation units 102 adjacent to each other share one interconnector 150. Specifically, the upper interconnector 150 of a certain electricity generation unit 102 serves also as the lower interconnector 150 of another electricity generation unit 102 adjacently located on the upper side of the certain electricity generation unit 102. The fuel cell stack 100 includes the pair of end plates 104 and 106. Therefore, the uppermost electricity generation unit 102 in the fuel cell stack 100 has no upper interconnector 150, and the lowermost electricity generation unit 102 has no lower interconnector 150 (see FIGS. 2 and 3).

Each unit cell 110 includes an electrolyte layer 112 and further includes a cathode 114 and an anode 116 that face each other in the vertical direction (the arrangement direction of the electricity generation units 102) with the electrolyte layer 112 therebetween. The unit cell 110 in the present embodiment is an anode-support-type unit cell in which the anode 116 supports the electrolyte layer 112 and the cathode 114.

The electrolyte layer 112 is an approximately rectangular flat plate-shaped member when viewed in the Z-axis direction and is a dense layer. The electrolyte layer 112 is formed of a solid oxide such as YSZ (yttria-stabilized zirconia), ScSZ (scandia-stabilized zirconia), SDC (samarium-doped ceria), GDC (gadolinium-doped ceria), or a perovskite-type oxide. The cathode 114 is an approximately rectangular flat plate-shaped member smaller than the electrolyte layer 112 when viewed in the Z-axis direction and is a porous layer. The cathode 114 is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is an approximately rectangular flat plate-shaped member having approximately the same size as the electrolyte layer 112 when viewed in the Z-axis direction and is a porous layer. The anode 116 is formed of, for example, a cermet composed of Ni and oxide ion conductive ceramic particles (e.g., YSZ particles). As described above, each unit cell 110 (each electricity generation unit 102) in the present embodiment is a solid oxide fuel cell (SOFC) that uses a solid oxide as the electrolyte.

The separator 120 is a frame-shaped member that has an approximately rectangular hole 121 formed in a central region thereof and passing therethrough in the vertical direction and is formed of, for example, a metal. A portion of the separator 120 located around the hole 121 faces a peripheral edge portion of a surface of the electrolyte layer 112, which surface is located on the cathode 114 side. The separator 120 is bonded to the electrolyte layer 112 (the unit cell 110) through a bonding member 124 formed of a brazing material (e.g., Ag solder) and disposed on a portion of the separator 120 that faces the electrolyte layer 112. The separator 120 separates the cathode chamber 166 to which the cathode 114 is facing from the anode chamber 176 to which the anode 116 is facing, and gas leakage from one electrode side to the other electrode side in the peripheral edge portion of the unit cell 110 is thereby prevented.

The cathode-side frame 130 is a frame-shaped member having an approximately rectangular hole 131 formed in a central region thereof and passing therethrough in the vertical direction and is formed of, for example, an insulator such as mica. The cathode-side frame 130 is in contact with a peripheral edge portion of a surface of the separator 120, which surface is located on the side opposite the electrolyte layer 112, and with a peripheral edge portion of a surface of one of the interconnectors 150, which surface is located on the side toward the cathode 114. The cathode-side frame 130 electrically insulates the pair of interconnectors 150 included in the electricity generation unit 102 from each other.

As shown in FIGS. 4 and 6, the hole 131 of the cathode-side frame 130 forms the cathode chamber 166 to which the cathode 114 is facing. As shown in FIG. 6, the hole 131 has an approximately rectangular contour when viewed in the Z-axis direction. The hole 131 has a first inner circumferential surface IP1 and a second inner circumferential surface IP2 that face each other in the X-axis direction. In the contour of the hole 131, a portion defined by the first inner circumferential surface IP1 and a portion defined by the second inner circumferential surface IP2 include straight portions approximately parallel to the Y-axis direction. As shown in FIGS. 4 and 6, oxidant gas supply communication channels 132 and oxidant gas discharge communication channels 133 are formed in the cathode-side frame 130. Each oxidant gas supply communication channel 132 is in communication with one of the communication holes 108 that forms the oxidant gas introduction manifold 161 and has an opening at the first inner circumferential surface IP1 of the hole 131 forming the cathode chamber 166. Each oxidant gas discharge communication channel 133 is in communication with one of the communication holes 108 that forms the oxidant gas discharge manifold 162 and has an opening at the second inner circumferential surface IP2 of the hole 131 forming the cathode chamber 166. In the present embodiment, three oxidant gas supply communication channels 132 and three oxidant gas discharge communication channels 133 are formed in the cathode-side frame 130.

The cathode-side frame 130 corresponds to the cathode-side member in the claims, and the hole 131 corresponds to the cathode chamber hole in the claims. One of the communication holes 108 that is formed in the cathode-side frame 130 and forms the oxidant gas introduction manifold 161 corresponds to the cathode-side gas supply channel hole in the claims, and one of the communication holes 108 that is formed in the cathode-side frame 130 and forms the oxidant gas discharge manifold 162 corresponds to the cathode-side gas discharge channel hole in the claims. The oxidant gas supply communication channels 132 each correspond to the cathode-side supply communication channel in the claims, and the oxidant gas discharge communication channels 133 each correspond to the cathode-side discharge communication channel in the claims. The X-axis direction corresponds to the second direction in the claims.

The anode-side frame 140 is a frame-shaped member having an approximately rectangular hole 141 formed in a central region thereof and passing therethrough in the vertical direction and is formed of, for example, a metal. The anode-side frame 140 is in contact with a peripheral edge portion of a surface of the separator 120, which surface is located on the side toward the electrolyte layer 112, and with a peripheral edge portion of a surface of one of the interconnectors 150, which surface is located on the side toward the anode 116.

As shown in FIGS. 4, 5, and 7, the hole 141 of the anode-side frame 140 forms the anode chamber 176 to which the anode 116 is facing. As shown in FIG. 7, the hole 141 has an approximately rectangular contour when viewed in the Z-axis direction. The hole 141 has a third inner circumferential surface IP3 and a fourth inner circumferential surface IP4 that face each other in the X-axis direction. In the contour of the hole 141, a portion defined by the third inner circumferential surface IP3 and a portion defined by the fourth inner circumferential surface IP4 include straight portions approximately parallel to the Y-axis direction. As shown in FIGS. 5 and 7, a fuel gas supply communication channel 142 and a fuel gas discharge communication channel 143 are formed in the anode-side frame 140. The fuel gas supply communication channel 142 is in communication with one of the communication holes 108 that forms the fuel gas introduction manifold 171 and has an opening at the third inner circumferential surface IP3 of the hole 141 forming the anode chamber 176. The fuel gas discharge communication channel 143 is in communication with one of the communication holes 108 that forms the fuel gas discharge manifold 172 and has an opening at the fourth inner circumferential surface IP4 of the hole 141 forming the anode chamber 176. In the present embodiment, one fuel gas supply communication channel 142 and one fuel gas discharge communication channel 143 are formed in the anode-side frame 140.

The anode-side frame 140 corresponds to the anode-side member in the claims, and the hole 141 corresponds to the anode chamber hole in the claims. The communication hole 108 formed in the anode-side frame 140 and forming the fuel gas introduction manifold 171 corresponds to the anode-side gas supply channel hole in the claims, and the communication hole 108 formed in the anode-side frame 140 and forming the fuel gas discharge manifold 172 corresponds to the anode-side gas discharge channel hole in the claims. The fuel gas supply communication channel 142 corresponds to the anode-side supply communication channel in the claims, and the fuel gas discharge communication channel 143 corresponds to the anode-side discharge communication channel in the claims.

As shown in FIGS. 4 to 6, in each electricity generation unit 102, the cathode-side current collector 134 is disposed in the cathode chamber 166. The cathode-side current collector 134 includes a plurality of approximately quadrangular prism-shaped current collector elements 135 and is formed of, for example, ferritic stainless steel. The cathode-side current collector 134 is in contact with a surface of the cathode 114 that is opposite to its surface facing the electrolyte layer 112 and with a surface of one of the interconnectors 150 that faces the cathode 114. However, as described above, since the uppermost electricity generation unit 102 in the fuel cell stack 100 does not have the upper interconnector 150, the cathode-side current collector 134 of the uppermost electricity generation unit 102 is in contact with the upper end plate 104. The cathode-side current collector 134 having the above-described structure electrically connects the cathode 114 to one of the interconnectors 150 (or the end plate 104). In the present embodiment, the cathode-side current collector 134 and the one of the interconnectors 150 are formed as an integrated member. Specifically, in the integrated member, a flat plate-shaped portion orthogonal to the vertical direction (the Z-axis direction) serves as the interconnector 150, and the current collector elements 135 that are a plurality of protrusions formed so as to protrude from the flat plate-shaped portion toward the cathode 114 serve as the cathode-side current collector 134. The integrated member composed of the cathode-side current collector 134 and the interconnector 150 may be coated with an electrically conductive coating, and an electrically conductive junction layer may be interposed between the cathode 114 and the cathode-side current collector 134 so as to join them together.

As shown in FIGS. 4, 5, and 7, in each electricity generation unit 102, the anode-side current collector 144 is disposed in the anode chamber 176. The anode-side current collector 144 includes interconnector-facing portions 146, electrode-facing portions 145, and connecting portions 147 that connect the electrode-facing portions 145 to the interconnector-facing portions 146 and is formed of, for example, nickel, a nickel alloy, or stainless steel. The electrode-facing portions 145 are in contact with a surface of the anode 116 that is opposite to its surface facing the electrolyte layer 112, and the interconnector-facing portions 146 are in contact with a surface of one of the interconnectors 150 that faces the anode 116. However, as described above, since the lowermost electricity generation unit 102 in the fuel cell stack 100 does not include the lower interconnector 150, the interconnector-facing portions 146 of the lowermost electricity generation unit 102 are in contact with the lower end plate 106. The anode-side current collector 144 having the above-described structure electrically connects the anode 116 to one of the interconnectors 150 (or the end plate 106). Spacers 149 formed of, for example, mica are disposed between the electrode-facing portions 145 and the interconnector-facing portions 146. Therefore, the anode-side current collector 144 follows the deformation of the electricity generation unit 102 that is caused by temperature cycles or fluctuations in reaction gas pressure, and a good electrical connection is maintained between the anode 116 and the interconnector 150 (or the end plate 106) through the anode-side current collector 144.

A-2. Operation of Fuel Cell Stack 100:

As shown in FIGS. 2, 4, and 6, when the oxidant gas OG is supplied through a gas tube (not shown) connected to the branched portion 29 of one of the gas passage members 27 that is disposed at a position corresponding to the oxidant gas introduction manifold 161, the oxidant gas OG flows through the branched portion 29 and the main body 28 of the gas passage member 27 and through one of the channel through holes 107 of the lower end plate 106 and is then supplied to the oxidant gas introduction manifold 161. The oxidant gas OG is then supplied from the oxidant gas introduction manifold 161 through the oxidant gas supply communication channels 132 of each electricity generation unit 102 to its cathode chamber 166. As shown in FIGS. 3, 5, and 7, when the fuel gas FG is supplied through a gas tube (not shown) connected to the branched portion 29 of one of the gas passage members 27 that is disposed at a position corresponding to the fuel gas introduction manifold 171, the fuel gas FG flows through the branched portion 29 and the main body 28 of the gas passage member 27 and through one of the channel through holes 107 of the lower end plate 106 and is then supplied to the fuel gas introduction manifold 171. The fuel gas FG is then supplied from the fuel gas introduction manifold 171 through the fuel gas supply communication channel 142 of each electricity generation unit 102 to its anode chamber 176.

When the oxidant gas OG is supplied to the cathode chamber 166 of each electricity generation unit 102 and the fuel gas FG is supplied to its anode chamber 176, oxygen contained in the oxidant gas OG and hydrogen contained in the fuel gas FG undergo an electrochemical reaction in the unit cell 110, and electric power is thereby generated. This power generation reaction is an exothermic reaction. In each electricity generation unit 102, the cathode 114 of the unit cell 110 is electrically connected to one of the interconnectors 150 through the cathode-side current collector 134, and the anode 116 is electrically connected to the other one of the interconnectors 150 through the anode-side current collector 144. The plurality of electricity generation units 102 included in the fuel cell stack 100 are electrically connected in series. Therefore, electric energy generated in the electricity generation units 102 is outputted from the end plates 104 and 106 of the fuel cell stack 100 that serve as output terminals. In the SOFC, since the electric power is generated at a relatively high temperature (e.g., 700° C. to 1,000° C.), the fuel cell stack 100 may be heated by a heater (not shown) after startup until heat generated by power generation can maintain the high temperature.

As shown in FIGS. 2, 4, and 6, the oxidant off-gas OOG discharged from the cathode chamber 166 of each electricity generation unit 102 is discharged to the oxidant gas discharge manifold 162 through the oxidant gas discharge communication channels 133, passes through one of the channel through holes 107 in the lower end plate 106 and through the main body 28 and the branched portion 29 of one of the gas passage members 27 that is disposed at a position corresponding to the oxidant gas discharge manifold 162, and is then discharged to the outside of the fuel cell stack 100 through a gas tube (not shown) connected to the branched portion 29. As shown in FIGS. 3, 5, and 7, the fuel off-gas FOG discharged from the anode chamber 176 of each electricity generation unit 102 is discharged through the fuel gas discharge communication channel 143 to the fuel gas discharge manifold 172, passes through one of the channel through holes 107 in the lower end plate 106 and through the main body 28 and the branched portion 29 of one of the gas passage members 27 that is disposed at a position corresponding to the fuel gas discharge manifold 172, and is then discharged to the outside of the fuel cell stack 100 through a gas tube (not shown) connected to the branched portion 29.

As described above, in each of the electricity generation units 102 included in the fuel cell stack 100 in the present embodiment, the facing direction of the first inner circumferential surface IP1 of the hole 131 of the cathode-side frame 130 at which surface the oxidant gas supply communication channels 132 have their openings and the second inner circumferential surface IP2 at which the oxidant gas discharge communication channels 133 have their openings (i.e., the X-axis direction) is approximately the same as the facing direction of the third inner circumferential surface IP3 of the hole 141 of the anode-side frame 140 at which surface the fuel gas supply communication channel 142 has its opening and the fourth inner circumferential surface IP4 at which the fuel gas discharge communication channel 143 has its opening (i.e., the X-axis direction). Moreover, the communication hole 108 forming the oxidant gas introduction manifold 161 and the communication hole 108 forming the fuel gas discharge manifold 172 are disposed on the same side in the facing direction (the positive side in the X-axis direction), and the communication hole 108 forming the oxidant gas discharge manifold 162 and the communication hole 108 forming the fuel gas introduction manifold 171 are disposed on the same side in the facing direction (the negative side in the X-axis direction). Therefore, the main flow direction of the oxidant gas OG in the cathode chamber 166 in each electricity generation unit 102 (the negative X-axis direction as shown in FIG. 6) is approximately opposite to the main flow direction of the fuel gas FG in the anode chamber 176 (the positive X-axis direction as shown in FIG. 7). Specifically, the electricity generation units 102 (the fuel cell stack 100) in the present embodiment are the SOFCs of the counter flow type.

Figure 8:
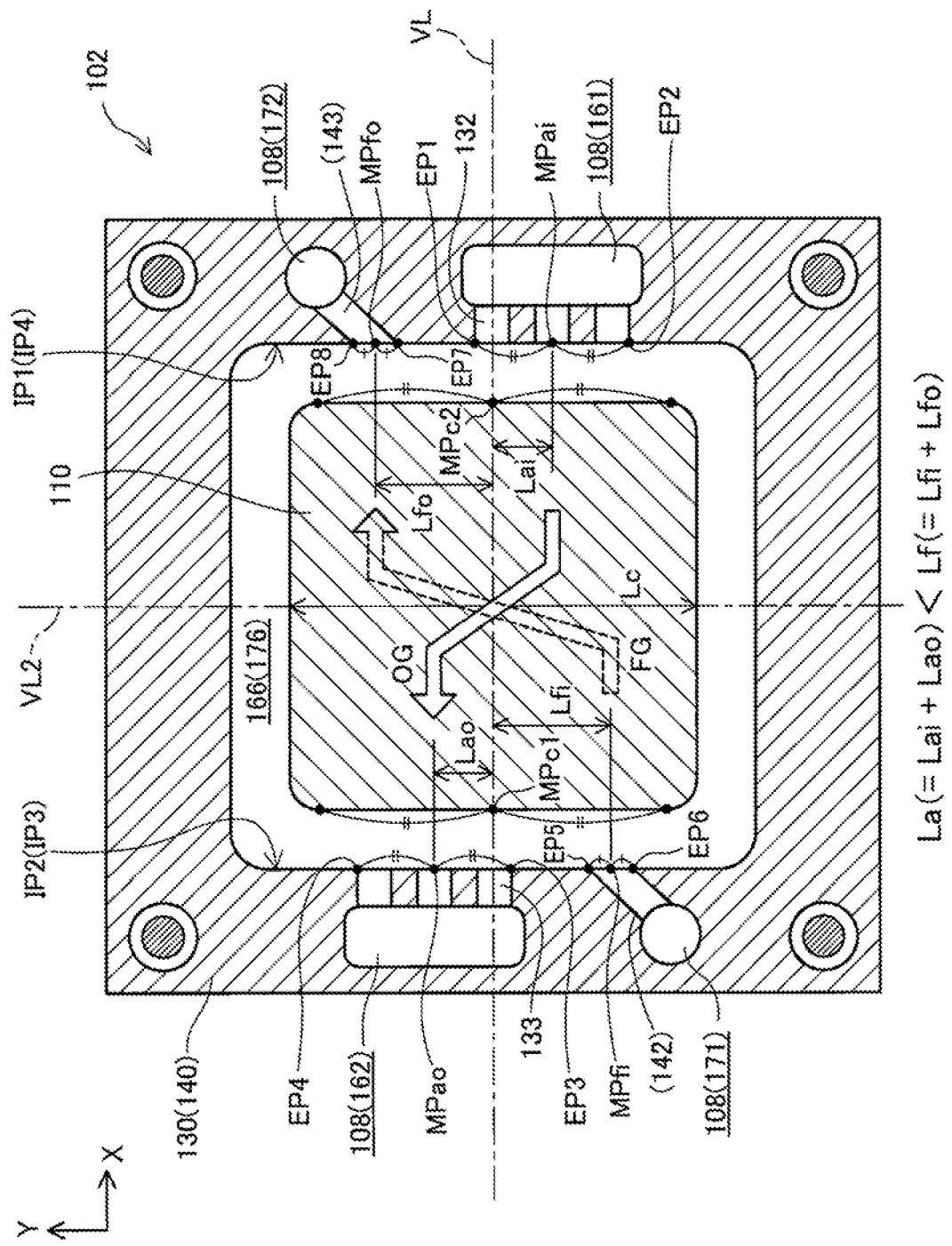
FIG. 8 is an XY cross-sectional view showing specific structures of flow channels formed in an electricity generation unit 102.

A-3. Specific Structures of Flow Channels Formed in Electricity Generation Units 102:

Next, specific structures of the channels formed in each electricity generation unit 102 will be described. FIG. 8 is an XY cross-sectional view showing the specific structures of the channels formed in one of the electricity generation units 102. For the sake of description, the communication channels formed in the anode-side frame 140 (the fuel gas supply communication channel 142 and the fuel gas discharge communication channel 143) are also shown in FIG. 8 in addition to the communication channels formed in the cathode-side frame 130 (the oxidant gas supply communication channels 132 and the oxidant gas discharge communication channels 133). In the actual structure, the fuel gas supply communication channel 142 and the fuel gas discharge communication channel 143 are not formed in the cathode-side frame 130, and the oxidant gas supply communication channels 132 and the oxidant gas discharge communication channels 133 are not formed in the anode-side frame 140, as described above.

As shown in FIG. 8, in each of the electricity generation units 102 in the present embodiment, the communication channels (the oxidant gas supply communication channels 132 and the oxidant gas discharge communication channels 133) formed in the cathode-side frame 130 do not overlap the communication channels (the fuel gas supply communication channel 142 and the fuel gas discharge communication channel 143) formed in the anode-side frame 140 when they are viewed in the Z-axis direction.

When each electricity generation unit 102 in the present embodiment is viewed in the Z-axis direction, the openings of the communication channels (the oxidant gas supply communication channels 132 and the oxidant gas discharge communication channels 133) formed in the cathode-side frame 130 and in communication with the cathode chamber 166 are disposed closer to a center position, with respect to a direction (the Y-axis direction) orthogonal to the main flow direction of the oxidant gas OG or the fuel gas FG (the X-axis direction), of the unit cell 110 (the center position is the position of a virtual straight line VL defined below) than the openings of the communication channels (the fuel gas supply communication channel 142 and the fuel gas discharge communication channel 143) formed in the anode-side frame 140 and in communication with the anode chamber 176.

Virtual Straight Line VL:

A virtual straight line connecting the midpoint MPc1 of one peripheral side of the unit cell 110 (specifically, one of the layers in the unit cell 110 that has the smallest size in the plane directions, i.e., the cathode 114 in the present embodiment) on one side in the X-axis direction (the negative side in the X-axis direction) (more specifically, the midpoint of an approximately straight portion of the peripheral side (the same applies to the following)) to the midpoint MPc2 of another peripheral side on the other side in the X-axis direction (the positive side in the X-axis direction).

More specifically, when each electricity generation unit 102 in the present embodiment is viewed in the Z-axis direction, the sum La of a first distance Lai and a second distance Lao defined below (the sum La is hereinafter referred to as the "cathode-side distance sum La") is smaller than the sum Lf of a third distance Lfi and a fourth distance Lfo (the sum Lf is hereinafter referred to as the "anode-side distance sum Lf").

First distance Lai:
The distance between the virtual straight line VL and the midpoint MPai between opposite end points EP1 and EP2 of a cathode-side supply opening group including all the openings of the oxidant gas supply communication channels 132 at the first inner circumferential surface IP1. Second distance Lao:
The distance between the virtual straight line VL and the midpoint MPao between opposite end points EP3 and EP4 of a cathode-side discharge opening group including all the openings of the oxidant gas discharge communication channels 133 at the second inner circumferential surface IP2. Third distance Lfi:
The distance between the virtual straight line VL and the midpoint MPfi between opposite end points EP5 and EP6 of an anode-side supply opening group including all the opening of the fuel gas supply communication channel 142 at the third inner circumferential surface IP3. Fourth distance Lfo:
The distance between the virtual straight line VL and the midpoint MPfo between opposite end points EP7 and EP8 of an anode-side discharge opening group including all the opening of the fuel gas discharge communication channel 143 at the fourth inner circumferential surface IP4.

As shown in FIG. 8, when each electricity generation unit 102 in the present embodiment is viewed in the Z-axis direction, the sum of the total opening width of the cathode-side supply opening group including all the openings of the oxidant gas supply communication channels 132 at the first inner circumferential surface IP1 and the total opening width of the cathode-side discharge opening group including all the openings of the oxidant gas discharge communication channels 133 at the second inner circumferential surface IP2 is larger than the sum of the total opening width of the anode-side supply opening group including the opening of the fuel gas supply communication channel 142 at the third inner circumferential surface IP3 and the total opening width of the anode-side discharge opening group including the opening of the fuel gas discharge communication channel 143 at the fourth inner circumferential surface IP4.

As shown in FIG. 8, in each electricity generation unit 102 in the present embodiment, the sum of the area of the communication hole 108 forming the oxidant gas introduction manifold 161 and the area of the communication hole 108 forming the oxidant gas discharge manifold 162 is larger than the sum of the area of the communication hole 108 forming the fuel gas introduction manifold 171 and the area of the communication hole 108 forming the fuel gas discharge manifold 172. More specifically, the area of the communication hole 108 forming the oxidant gas introduction manifold 161 is larger than the area of the communication hole 108 forming the fuel gas introduction manifold 171, and the area of the communication hole 108 forming the oxidant gas discharge manifold 162 is larger than the area of the communication hole 108 forming the fuel gas discharge manifold 172.

A-4. Effects of Present Embodiment:

As described above, each of the electricity generation units 102 included in the fuel cell stack 100 of the present embodiment includes the unit cell 110, the cathode-side frame 130, and the anode-side frame 140. The cathode-side frame 130 has: the hole 131 that forms the cathode chamber 166 to which the cathode 114 is facing and has the first inner circumferential surface IP1 and the second inner circumferential surface IP2 facing each other in the X-axis direction; the communication hole 108 forming the oxidant gas introduction manifold 161 through which the gas to bP supplied to the cathode chamber 166 flows; the communication hole 108 forming the oxidant gas discharge manifold 162 through which the gas discharged from the cathode chamber 166 flows; at least one oxidant gas supply communication channel 132 that is in communication with the communication hole 108 forming the oxidant gas introduction manifold 161 and has an opening at the first inner circumferential surface IP1 of the hole 131; and at least one oxidant gas discharge communication channel 133 that is in communication with the communication hole 108 forming the oxidant gas discharge manifold 162 and has an opening at the second inner circumferential surface IP2 of the hole 131. The anode-side frame 140 has: the hole 141 that forms the anode chamber 176 to which the anode 116 is facing and has the third inner circumferential surface IP3 and the fourth inner circumferential surface 184 that face each other in the X-axis direction; the communication hole 108 forming the fuel gas introduction manifold 171 through which the gas to be supplied to the anode chamber 176 flows; the communication hole 108 forming the fuel gas discharge manifold 172 through which the gas discharged from the anode chamber 176 flows; at least one fuel gas supply communication channel 142 that is in communication with the communication hole 108 forming the fuel gas introduction manifold 171 and has an opening at the third inner circumferential surface IP3 of the hole 141; and at least one fuel gas discharge communication channel 143 that is in communication with the communication hole 108 forming the fuel gas discharge manifold 172 and has an opening at the fourth inner circumferential surface IP4 of the hole 141. When each of the electricity generation units 102 included in the fuel cell stack 100 in the present embodiment is viewed in the Z-axis direction, the sum La (the cathode-side distance sum La) of the first distance Lai and the second distance Lao is smaller than the sum Lf (the anode-side distance sum Lf) of the third distance Lfi and the fourth distance Lfo.

Each of the electricity generation units 102 included in the fuel cell stack 100 in the present embodiment is configured as described above. Therefore, as described below, a reduction in the electricity generation performance of the unit cell 110 caused by insufficient spreading of the oxidant gas OG can be prevented.

When the plurality of electricity generation units 102 are arranged to form the fuel cell stack 100, a pressure (surface pressure) in the Z-axis direction tends to be low in portions where the communication channels are formed in the cathode-side frames 130 and the anode-side frames 140. As described above, when each of the electricity generation units 102 in the present embodiment is viewed in the Z-axis direction, the communication channels (the oxidant gas supply communication channels 132 and the oxidant gas discharge communication channels 133) formed in the cathode-side frame 130 do not overlap the communication channels (the fuel gas supply communication channel 142 and the fuel gas discharge communication channel 143) formed in the anode-side frame 140. Therefore, in each of the electricity generation units 102 in the present embodiment, it is possible to prevent the occurrence of gas leakage, which would otherwise occur when the portions where the surface pressure tends to decrease overlap each other as viewed in the Z-axis direction.

However, when this structure is used, it is impossible to dispose the openings of the communication channels (the oxidant gas supply communication channels 132 and the oxidant gas discharge communication channels 133) formed in the cathode-side frame 130 and in communication with the cathode chamber 166 and also the openings of the communication channels (the fuel gas supply communication channel 142 and the fuel gas discharge communication channel 143) formed in the anode-side frame 140 and in communication with the anode chamber 176 at positions ideal for gas diffusibility in the cathode chamber 166 or the anode chamber 176 (i.e., center positions of the unit cell 110 with respect to a direction orthogonal to the main flow direction of the oxidant gas OG or the fuel gas FG (the X-axis direction), the center positions being represented by the virtual straight line VL). Therefore, in the conventional SOFC, the openings of the communication channels formed in the cathode-side frame 130 and in communication with the cathode chamber 166 and the openings of the communication channels formed in the anode-side frame 140 and in communication with the anode chamber 176 are disposed at positions approximately symmetric with respect to the center position of the unit cell 110 (the position of the virtual straight line VL). In this conventional structure, the openings of the communication channels formed in the cathode-side frame 130 and in communication with the cathode chamber 166 and the openings of the communication channels formed in the anode-side frame 140 and in communication with the anode chamber 176 are disposed at certain distances from the center position of the unit cell 110.

The oxidant gas OG (e.g., air) has a larger average molecular weight than the fuel gas FG (e.g., hydrogen-rich gas), and therefore the diffusibility of the oxidant gas OG is low. In particular, since the SOFC is operated at relatively high temperature (e.g., 700° C. to 1,000° C.), the temperature of the oxidant gas OG is high. When the temperature of the oxidant gas OG is high, its viscosity tends to be higher than the viscosity of the fuel gas FG. Specifically, in a high-temperature environment, the oxidant gas OG is less likely to spread than the fuel gas FG. Therefore, in the conventional structure, although the fuel gas FG can spread well in plane directions, the oxidant gas OG does not spread sufficiently in the plane directions. In this case, a shortage of the oxidant gas OG may occur in some regions of the unit cell 110, causing a reduction in the electricity generation performance of the unit cell 110.

In each of the electricity generation units 102 in the present embodiment, the sum La (the cathode-side distance sum La) of the first distance Lai and the second distance Lao is smaller than the sum Lf (the anode-side distance sum Lf) of the third distance Lfi and the fourth distance Lfo, as described above. Specifically, the openings of the communication channels (the oxidant gas supply communication channels 132 and the oxidant gas discharge communication channels 133) formed in the cathode-side frame 130 and in communication with the cathode chamber 166 are disposed closer to the center position of the unit cell 110 (the position of the virtual straight line VL) than the openings of the communication channels (the fuel gas supply communication channel 142 and the fuel gas discharge communication channel 143) formed in the anode-side frame 140 and in communication with the anode chamber 176. Therefore, in each of the electricity generation units 102 in the present embodiment, the oxidant gas OG can spread well in the plane directions, and a reduction in the performance of the unit cell 110 caused by insufficient spreading of the oxidant gas OG in the plane directions can be prevented.

Since the viscosity of the oxidant gas OG at high temperature is high, pressure drop in channels such as the manifolds 161 and 162 tends to be large. As described above, in each of the electricity generation units 102 in the present embodiment, the sum of the area of the communication hole 108 forming the oxidant gas introduction manifold 161 and the area of the communication hole 108 forming the oxidant gas discharge manifold 162 is larger than the sum of the area of the communication hole 108 forming the fuel gas introduction manifold 171 and the area of the communication hole 108 forming the fuel gas discharge manifold 172. Therefore, in each of the electricity generation units 102 in the present embodiment, while the areas of the communication holes 108 forming the fuel gas introduction manifold 171 and the fuel gas discharge manifold 172 are not increased, the areas of the communication holes 108 forming the oxidant gas introduction manifold 161 and the oxidant gas discharge manifold 162 can be increased. This prevents an increase in the overall size of the electricity generation units 102 (the fuel cell stack 100). Therefore, the device can be reduced in size, and its startability can be improved. Moreover, the pressure drop in the manifolds 161 and 162 on the cathode 114 side can be reduced, and a reduction in the efficiency of the electricity generation units 102 (the fuel cell stack 100) can be prevented.

Figure 9:
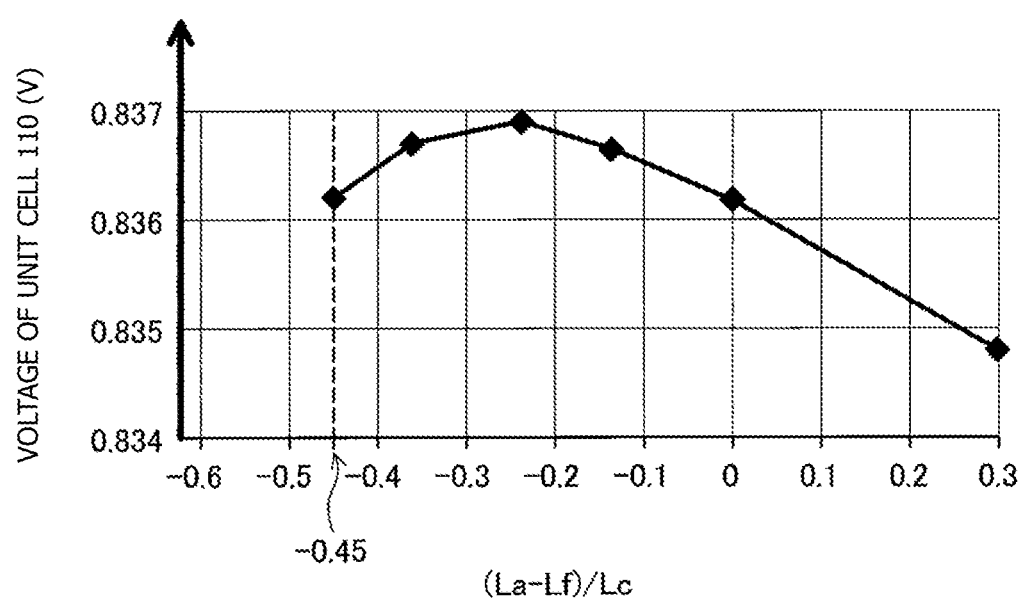
FIG. 9 is a graph illustrating the results of performance evaluation.

A-5. Performance Evaluation:

The relation between the structures of the flow channels described above and the electricity generation performance of the unit cell 110 was evaluated by simulations. FIG. 9 is a graph showing the results of the performance evaluation. In the performance evaluation, different fuel cell stacks 100 each including 10 unit cells 110 (10 electricity generation units 102) having the above-described structure were prepared. In these fuel cell stacks 100, the positions of the communication channels 132, 133, 142, and 143 in each unit cell 110 (each electricity generation unit 102) were changed to change the value of the difference between the cathode-side distance sum La and the anode-side distance sum Lf (La−Lf). In the performance evaluation, the voltage per unit cell 110 when electricity generation was performed at a temperature of 700° C. and a current density of 0.55 A/cm$^2$ was measured. To eliminate the influence of the size of the unit cell 110 (the electricity generation unit 102) on the value of the difference between the cathode-side distance sum La and the anode-side distance sum Lf (La−Lf), the value of the difference between the cathode-side distance sum La and the anode-side distance sum Lf (La−Lf) was divided by a reference length Lc (see FIG. 8) defined below.

Reference Length Lc:

The length of the unit cell 110 on a second virtual straight line VL2 defined below (the length of the unit cell 110 overlapping the second virtual straight line VL2).

Second Virtual Straight Line VL2:

A virtual straight line orthogonal to the virtual straight line VL and passing through the center of the unit cell 110 when it is viewed in the Z-axis direction (i.e., passing through the center in a plane direction).

FIG. 9 shows the relation between the value of (La−Lf)/Lc and the voltage of the unit cell 110. As shown in FIG. 9, in this performance evaluation, when the value of (La−Lf)/Lc is negative (i.e., the cathode-side distance sum La is smaller than the anode-side distance sum Lf), the voltage of the unit cell 110 is high. As can be seen from these results, when the communication channels 132, 133, 142, and 143 in each electricity generation unit 102 are configured such that the cathode-side distance sum La is smaller than the anode-side distance sum Lf as described above, a reduction in the performance of the unit cell 110 caused by insufficient spreading of the oxidant gas OG in the plane directions can be prevented.

As can be seen from the results in FIG. 9, in the performance evaluation, when the value of (La−Lf)/Lc is excessively small, the voltage of the unit cell 110 decreases. This may be because of the following reason. When the value of (La−Lf)/Lc is excessively small, the anode-side distance sum Lf is excessively large (the fuel gas supply communication channel 142 and the fuel gas discharge communication channel 143 are excessively separated from the center position), and therefore the efficiency of utilization of the fuel gas FG decreases. To prevent the reduction in the performance of the unit cell 110 more effectively, the value of (La−Lf)/Lc is preferably from −0.45 to 0 inclusive, more preferably from −0.4 to −0.1 inclusive, and still more preferably from −0.3 to −0.2 inclusive.

B. Modifications

The technique disclosed in the present description is not limited to the embodiment described above and may be modified into various forms without departing from the scope of the invention. For example, the following modifications are possible.

Figure 10:
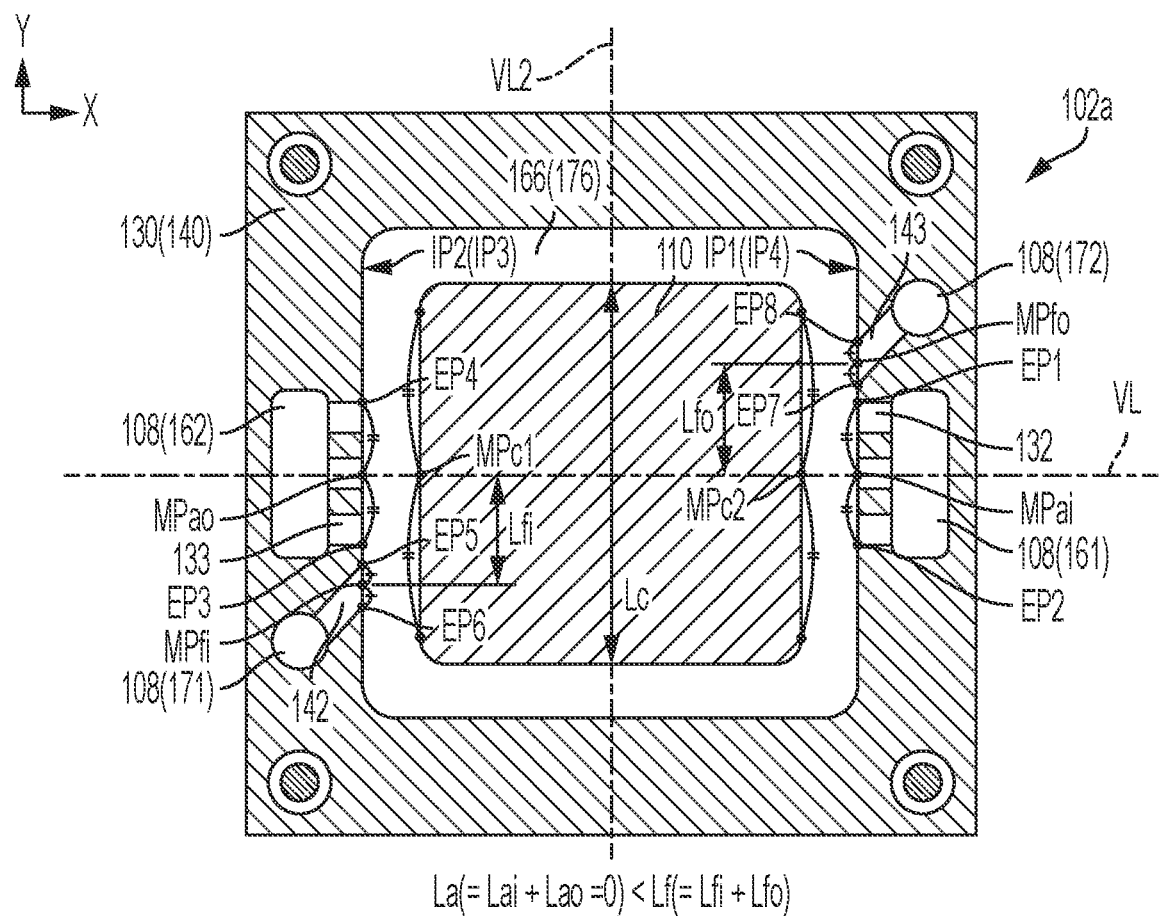
FIG. 10 is an XY cross-sectional view showing specific structures of flow channels formed in an electricity generation unit 102a in a first modification.

FIG. 10 is an XY cross-sectional view showing specific structures of flow channels formed in an electricity generation unit 102a in a first modification. In the electricity generation unit 102a in the first modification shown in FIG. 10, the communication hole 108 forming the oxidant gas introduction manifold 161 and the communication hole 108 forming the oxidant gas discharge manifold 162 are disposed closer to the center position of the unit cell 110 (the position of the virtual straight line VL) than those in the electricity generation unit 102 in the above embodiment shown in FIG. 8 etc. More specifically, in the electricity generation unit 102a in the first modification shown in FIG. 10, since the communication hole 108 forming the oxidant gas introduction manifold 161 is located just at the center position of the unit cell 110 (the position of the virtual straight line VL), the first distance Lai is zero. Similarly, since the communication hole 108 forming the oxidant gas discharge manifold 162 is located just at the center position of the unit cell 110 (the position of the virtual straight line VL), the second distance Lao is also zero.

In the electricity generation unit 102a in the first modification shown in FIG. 10, as in the electricity generation unit 102 in the above embodiment shown in FIG. 8 etc., the sum La (the cathode-side distance sum La) of the first distance Lai and the second distance Lao is smaller than the sum Lf (the anode-side distance sum Lf) of the third distance Lfi and the fourth distance Lfo. Therefore, in the electricity generation unit 102a in the first modification shown in FIG. 10, as in the electricity generation unit 102 in the above embodiment shown in FIG. 8 etc., the oxidant gas OG can spread well in the plane directions, and a reduction in the performance of the unit cell 110 caused by insufficient spreading of the oxidant gas OG can be prevented.

In the electricity generation unit 102a in the first modification shown in FIG. 10, as in the electricity generation unit 102 in the above embodiment shown in FIG. 8 etc., the sum of the area of the communication hole 108 forming the oxidant gas introduction manifold 161 and the area of the communication hole 108 forming the oxidant gas discharge manifold 162 is larger than the sum of the area of the communication hole 108 forming the fuel gas introduction manifold 171 and the area of the communication hole 108 forming the fuel gas discharge manifold 172. Therefore, in the electricity generation unit 102a in the first modification shown in FIG. 10, as in the electricity generation unit 102 in the above embodiment shown in FIG. 8 etc., an increase in the overall size of the electricity generation units 102a (the fuel cell stack 100) is prevented. Therefore, the device can be reduced in size, and its startability can be improved. Moreover, the pressure drop in the manifolds 161 and 162 on the cathode 114 side can be reduced, and a reduction in the efficiency of the electricity generation units 102a (the fuel cell stack 100) can be prevented.

Figure 11:
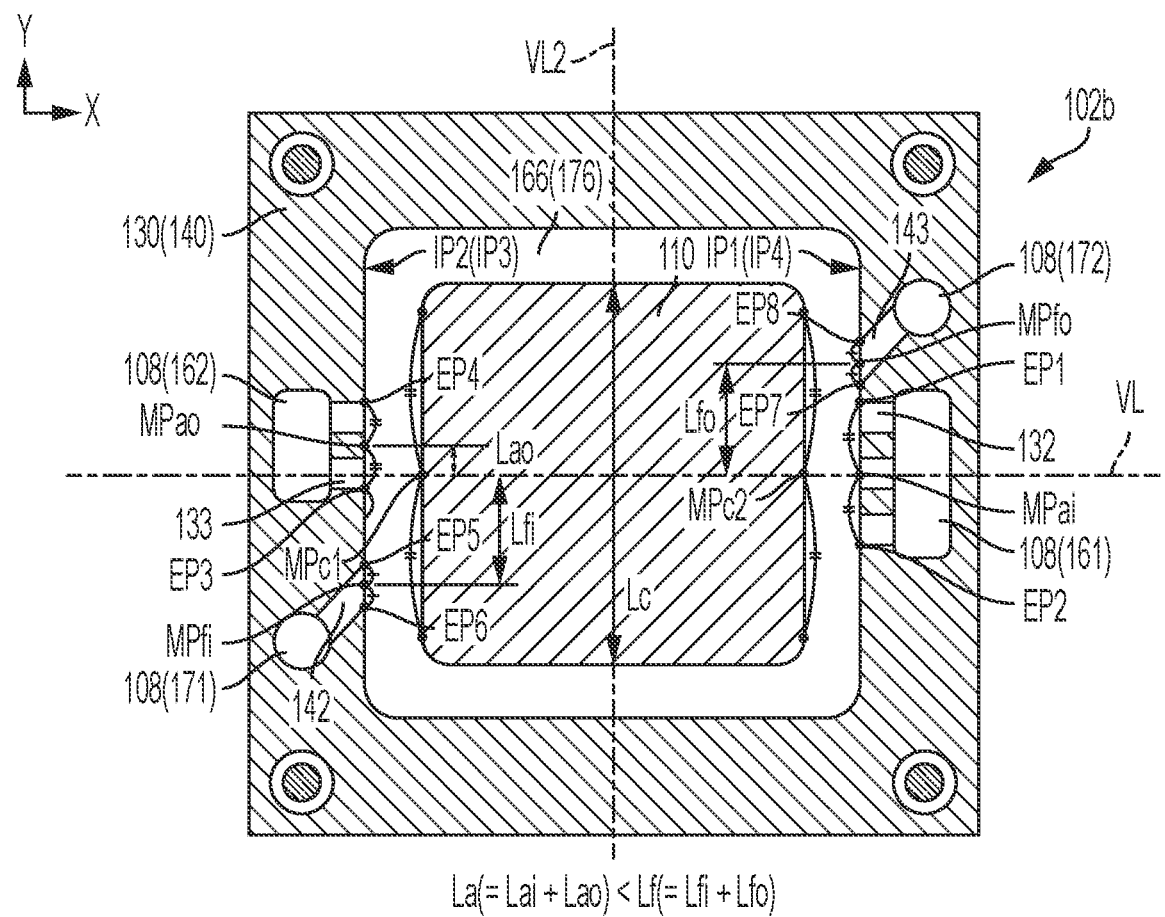
FIG. 11 is an XY cross-sectional view showing specific structures of flow channels formed in an electricity generation unit 102b in a second modification.

FIG. 11 is an XY cross-sectional view showing specific structures of flow channels formed in an electricity generation unit 102b in a second modification. In the electricity generation unit 102b in the second modification shown in FIG. 11, the communication hole 108 forming the oxidant gas introduction manifold 161 is disposed closer to the center position of the unit cell 110 (the position of the virtual straight line VL) than that in the electricity generation unit 102 in the above embodiment shown in FIG. 8 etc. More specifically, in the electricity generation unit 102b in the second modification shown in FIG. 11, since the communication hole 108 forming the oxidant gas introduction manifold 161 is located just at the center position of the unit cell 110 (the position of the virtual straight line VL), the first distance Lai is zero.

In the electricity generation unit 102b in the second modification shown in FIG. 11, the communication hole 108 forming the oxidant gas discharge manifold 162 is smaller than that in the electricity generation unit 102 in the above embodiment shown in FIG. 8 etc., and the number of oxidant gas discharge communication channels 133 is reduced to two.

In the electricity generation unit 102b in the second modification shown in FIG. 11, as in the electricity generation unit 102 in the above embodiment shown in FIG. 8 etc., the sum La (the cathode-side distance sum La) of the first distance Lai and the second distance Lao is smaller than the sum Lf (the anode-side distance sum Lf) of the third distance Lfi and the fourth distance Lfo. Therefore, in the electricity generation unit 102b in the second modification shown in FIG. 11, as in the electricity generation unit 102 in the above embodiment shown in FIG. 8 etc., the oxidant gas OG can spread well in the plane directions, and a reduction in the performance of the unit cell 110 caused by insufficient spreading of the oxidant gas OG can be prevented.

In the electricity generation unit 102b in the second modification shown in FIG. 11, as in the electricity generation unit 102 in the above embodiment shown in FIG. 8 etc., the sum of the area of the communication hole 108 forming the oxidant gas introduction manifold 161 and the area of the communication hole 108 forming the oxidant gas discharge manifold 162 is larger than the sum of the area of the communication hole 108 forming the fuel gas introduction manifold 171 and the area of the communication hole 108 forming the fuel gas discharge manifold 172. Therefore, in the electricity generation unit 102b in the second modification shown in FIG. 1I, as in the electricity generation unit 102 in the above embodiment shown in FIG. 8 etc., an increase in the overall size of the electricity generation units 102b (the fuel cell stack 100) is prevented. Therefore, the device can be reduced in size, and its startability can be improved. Moreover, the pressure drop in the manifolds 161 and 162 on the cathode 114 side can be reduced, and a reduction in efficiency of the electricity generation units 102b (the fuel cell stack 100) can be prevented.

Figure 12:
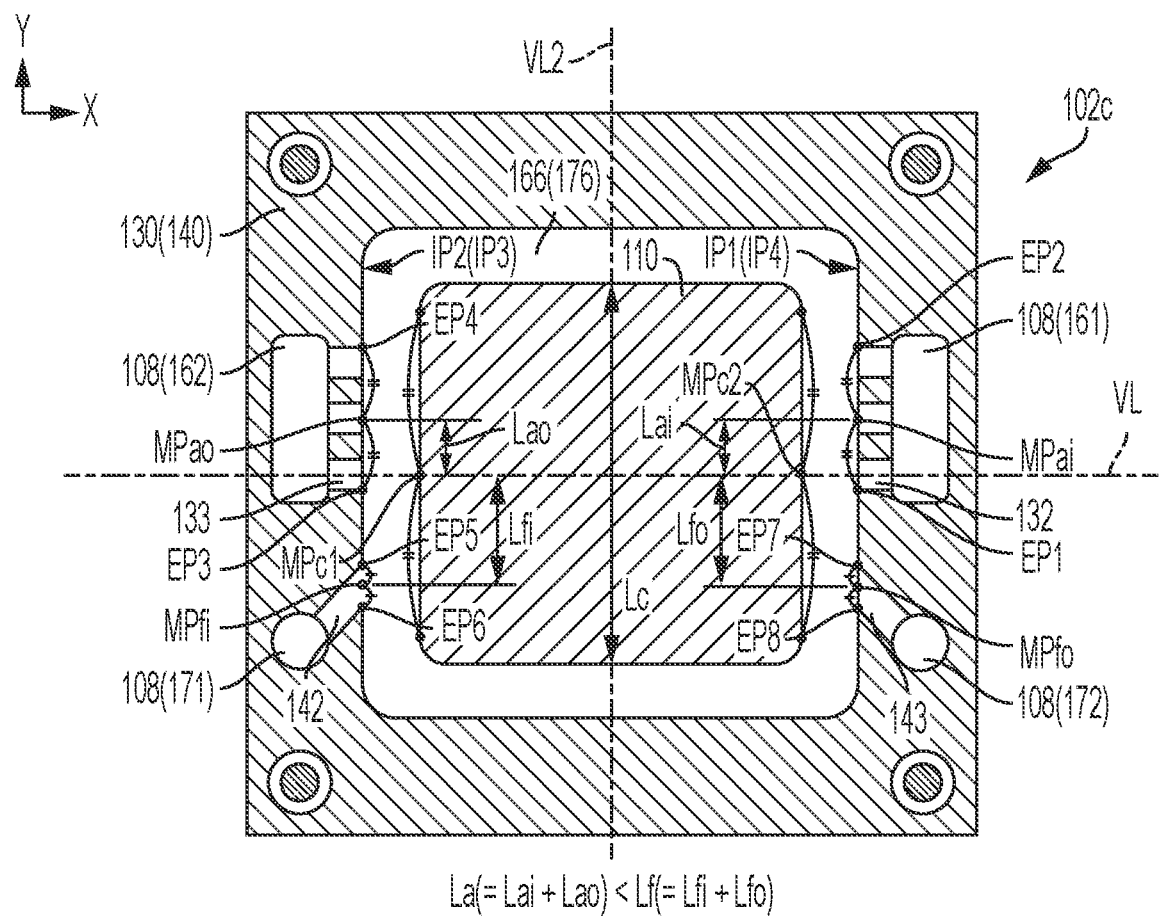
FIG. 12 is an XY cross-sectional view showing specific structures of flow channels formed in an electricity generation unit 102c in a third modification.

FIG. 12 is an XY cross-sectional view showing specific structures of flow channels formed in an electricity generation unit 102c in a third modification. In the electricity generation unit 102c in the third modification shown in FIG. 12, both the communication hole 108 forming the oxidant gas introduction manifold 161 and the communication hole 108 forming the oxidant gas discharge manifold 162 are located on one side (the positive side in the Y-axis direction) of the center position of the unit cell 110 (the position of the virtual straight line VL), and both the communication hole 108 forming the fuel gas introduction manifold 171 and the communication hole 108 forming the fuel gas discharge manifold 172 are located on the other side (the negative side in the Y-axis direction) of the center position of the unit cell 110 (the position of the virtual straight line VL).

In the electricity generation unit 102c in the third modification shown in FIG. 12, as in the electricity generation unit 102 in the above embodiment shown in FIG. 8 etc., the sum La (the cathode-side distance sum La) of the first distance Lai and the second distance Lao is smaller than the sum Lf (the anode-side distance sum Lf) of the third distance Lfi and the fourth distance Lfo. Therefore, in the electricity generation unit 102c in the third modification shown in FIG. 12, as in the electricity generation unit 102 in the above embodiment shown in FIG. 8 etc., the oxidant gas OG can spread well in the plane directions, and a reduction in the performance of the unit cell 110 caused by insufficient spreading of the oxidant gas OG can be prevented.

In the electricity generation unit 102c in the third modification shown in FIG. 12, as in the electricity generation unit 102 in the above embodiment shown in FIG. 8 etc., the sum of the area of the communication hole 108 forming the oxidant gas introduction manifold 161 and the area of the communication hole 108 forming the oxidant gas discharge manifold 162 is larger than the sum of the area of the communication hole 108 forming the fuel gas introduction manifold 171 and the area of the communication hole 108 forming the fuel gas discharge manifold 172. Therefore, in the electricity generation unit 102c in the third modification shown in FIG. 12, as in the electricity generation unit 102 in the above embodiment shown in FIG. 8 etc., an increase in the overall size of the electricity generation units 102c (the fuel cell stack 100) is prevented. Therefore, the device can be reduced in size, and its startability can be improved. Moreover, the pressure drop in the manifolds 161 and 162 on the cathode 114 side can be reduced, and a reduction in the efficiency of the electricity generation units 102c (the fuel cell stack 100) can be prevented.

Figure 13:
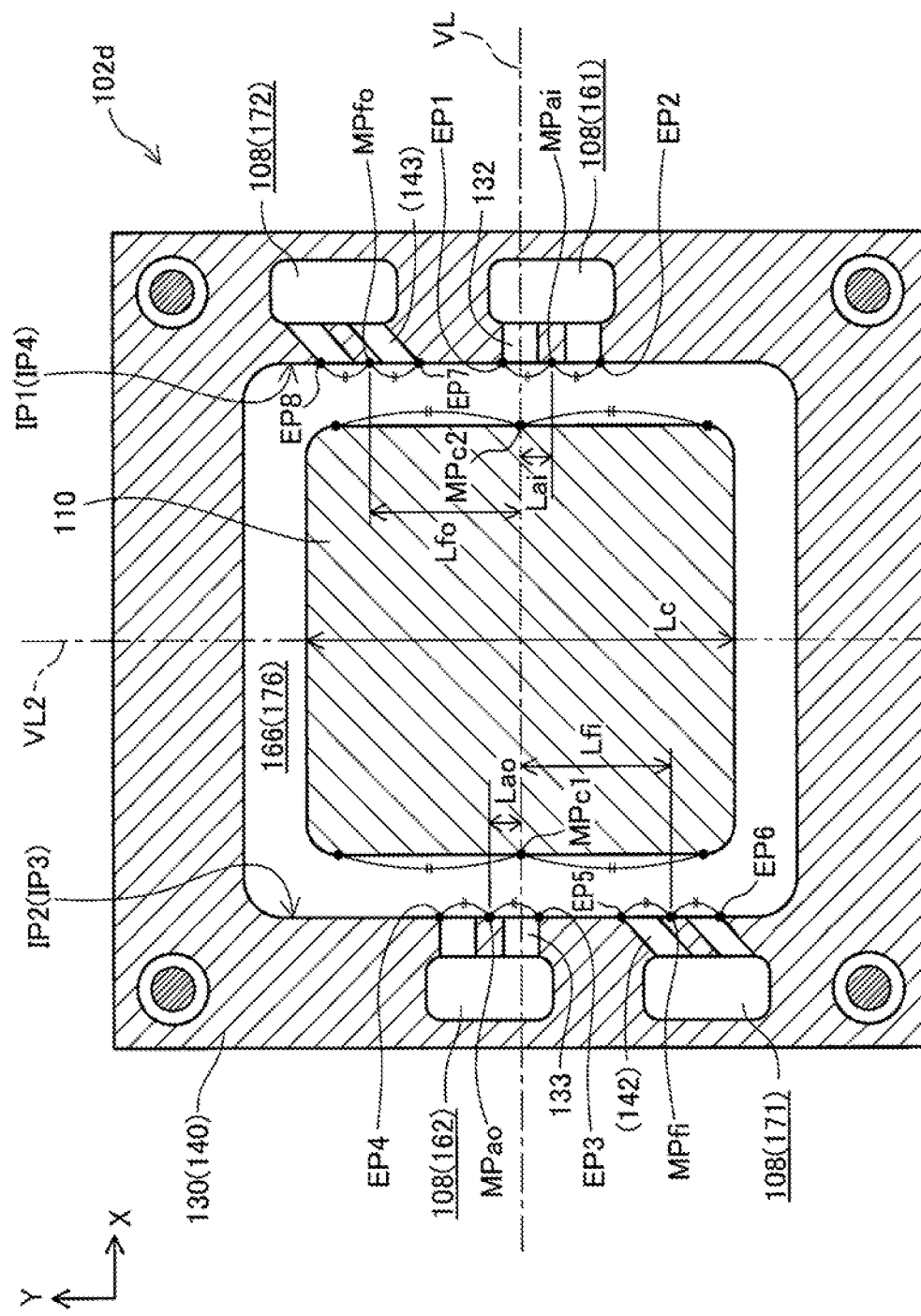
FIG. 13 is an XY cross-sectional view showing specific structures of flow channels formed in an electricity generation unit 102d in a fourth modification.

FIG. 13 is an XY cross-sectional view showing specific structures of flow channels formed in an electricity generation unit 102d in a fourth modification. In the electricity generation unit 102d in the fourth modification shown in FIG. 13, the sum of the area of the communication hole 108 forming the oxidant gas introduction manifold 161 and the area of the communication hole 108 forming the oxidant gas discharge manifold 162 is approximately the same as the sum of the area of the communication hole 108 forming the fuel gas introduction manifold 171 and the area of the communication hole 108 forming the fuel gas discharge manifold 172.

In the electricity generation unit 102d in the fourth modification shown in FIG. 13, as in the electricity generation unit 102 in the above embodiment shown in FIG. 8 etc., the sum La (the cathode-side distance sum La) of the first distance Lai and the second distance Lao is smaller than the sum Lf (the anode-side distance sum Lf) of the third distance Lfi and the fourth distance Lfo. Therefore, in the electricity generation unit 102d in the fourth modification shown in FIG. 13, as in the electricity generation unit 102 in the above embodiment shown in FIG. 8 etc., the oxidant gas OG can spread well in the plane directions, and a reduction in the performance of the unit cell 110 caused by insufficient spreading of the oxidant gas OG can be prevented.

Figure 14:
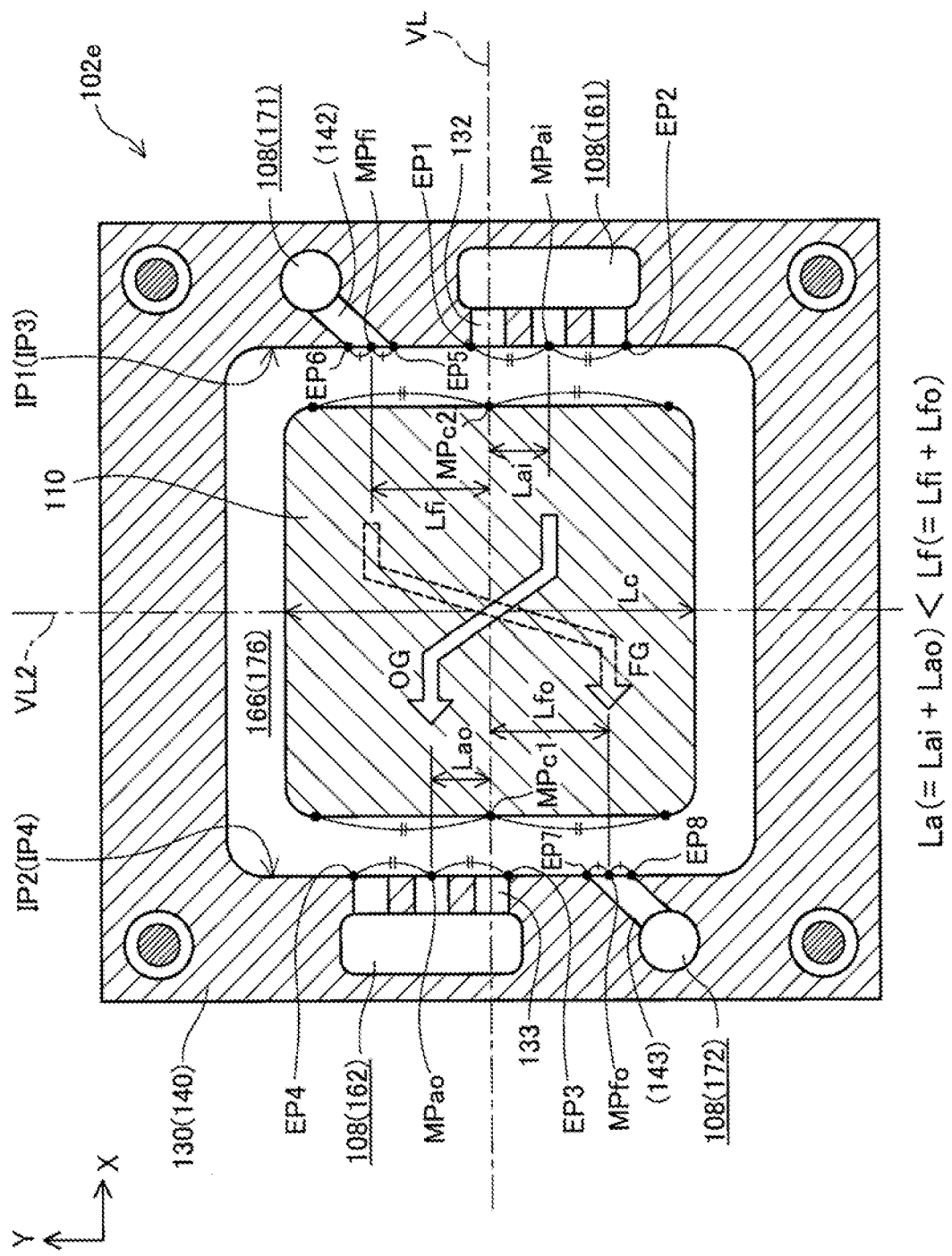
FIG. 14 is an XY cross-sectional view showing specific structures of flow channels formed in an electricity generation unit 102e in a fifth modification.

FIG. 14 is an XY cross-sectional view showing specific structures of flow channels formed in an electricity generation unit 102e in a fifth modification. In the electricity generation unit 102e in the fifth modification shown in FIG. 14, as in the electricity generation unit 102 in the above embodiment shown in FIG. 8 etc., the facing direction of the first inner circumferential surface IP1 of the hole 131 of the cathode-side frame 130 at which surface the oxidant gas supply communication channels 132 have their openings and the second inner circumferential surface IP2 at which the oxidant gas discharge communication channels 133 have their openings (i.e., the X-axis direction) is approximately the same as the facing direction of the third inner circumferential surface IP3 of the hole 141 of the anode-side frame 140 at which surface the fuel gas supply communication channel 142 has its opening and the fourth inner circumferential surface IP4 at which the fuel gas discharge communication channel 143 has its opening (i.e., the X-axis direction). However, in the electricity generation unit 102e in the fifth modification shown in FIG. 14, the communication hole 108 forming the oxidant gas introduction manifold 161 and the communication hole 108 forming the fuel gas introduction manifold 171 are disposed on the same side in the facing direction (the positive side in the X-axis direction), and the communication hole 108 forming the oxidant gas discharge manifold 162 and the communication hole 108 forming the fuel gas discharge manifold 172 are disposed on the same side in the facing direction (the negative side in the X-axis direction). Therefore, the main flow direction of the oxidant gas OG in the cathode chamber 166 in the electricity generation unit 102e (the negative X-axis direction as shown in FIG. 14) is approximately the same as the main flow direction of the fuel gas FG in the anode chamber 176 (the negative X-axis direction). Specifically, the electricity generation unit 102e in the fifth modification shown in FIG. 14 is an SOFC of the co-flow type.

In the electricity generation unit 102e in the fifth modification shown in FIG. 14, as in the electricity generation unit 102 in the above embodiment shown in FIG. 8 etc., the sum La (the cathode-side distance sum La) of the first distance Lai and the second distance Lao is smaller than the sum Lf (the anode-side distance sum Lf) of the third distance Lfi and the fourth distance Lfo. Therefore, in the electricity generation unit 102e in the fifth modification shown in FIG. 14, as in the electricity generation unit 102 in the above embodiment shown in FIG. 8 etc., the oxidant gas OG can spread well in the plane directions, and a reduction in the performance of the unit cell 110 caused by insufficient spreading of the oxidant gas OG can be prevented.

In the electricity generation unit 102e in the fifth modification shown in FIG. 14, as in the electricity generation unit 102 in the above embodiment shown in FIG. 8 etc., the sum of the area of the communication hole 108 forming the oxidant gas introduction manifold 161 and the area of the communication hole 108 forming the oxidant gas discharge manifold 162 is larger than the sum of the area of the communication hole 108 forming the fuel gas introduction manifold 171 and the area of the communication hole 108 forming the fuel gas discharge manifold 172. Therefore, in the electricity generation unit 102e in the fifth modification shown in FIG. 14, as in the electricity generation unit 102 in the above embodiment shown in FIG. 8 etc., an increase in the overall size of the electricity generation units 102e (the fuel cell stack 100) is prevented. Therefore, the device can be reduced in size, and its startability can be improved. Moreover, the pressure drop in the manifolds 161 and 162 on the cathode 114 side can be reduced, and a reduction in the efficiency of the electricity generation units 102e (the fuel cell stack 100) can be prevented.

The structure of the electricity generation units 102 or the fuel cell stack 100 in the above embodiment (and the modifications, the same applies to the following) is merely an example and can be modified variously. For example, in the above embodiment, the sum of the area of the communication hole 108 forming the oxidant gas introduction manifold 161 and the area of the communication hole 108 forming the oxidant gas discharge manifold 162 is larger than the sum of the area of the communication hole 108 forming the fuel gas introduction manifold 171 and the area of the communication hole 108 forming the fuel gas discharge manifold 172. However, it is not always necessary that the above relation be satisfied.

In the above embodiment, it is not always necessary that the relation that the cathode-side distance sum La is smaller than the anode-side distance sum Lf be satisfied for all the electricity generation units 102 included in the fuel cell stack 100. When the above relation is satisfied in at least one of the electricity generation units 102 included in the fuel cell stack 100, a reduction in the performance of the unit cell 110 caused by insufficient spreading of the oxidant gas OG in the plane directions can be prevented in the at least one of the electricity generation units 102.

In the above embodiment, the bolt holes 109 provided are independent of the communication holes 108 for the manifolds. However, the independent bolt holes 109 may be omitted, and the communication holes 108 for the manifolds may be used also as bolt holes. In the above embodiment, an intermediate layer may be disposed between the cathode 114 and the electrolyte layer 112. In the above embodiment, the number of electricity generation units 102 included in the fuel cell stack 100 is merely an example. The number of electricity generation units 102 is determined as appropriate according to the required output voltage of the fuel cell stack 100, etc. The materials forming the components in the above embodiment are merely examples, and other materials may be used to form these components.

The above embodiment relates to the SOFC that generates electricity by utilizing the electrochemical reaction of hydrogen contained in the fuel gas with oxygen contained in the oxidant gas. However, the present invention is also applicable to an electrolysis cell unit that is a structural unit of a solid oxide electrolysis cell (SOEC) that generates hydrogen by utilizing an electrolysis reaction of water and to an electrolysis cell stack including a plurality of electrolysis cell units. The structure of the electrolysis cell stack is well-known and described in, for example, Japanese Patent Application Laid-Open (kokai) No. 2016-81813, and therefore the detailed description thereof will be omitted. The structure of the electrolysis cell stack is generally the same as the structure of the fuel cell stack 100 of the above embodiment. Specifically, the fuel cell stack 100 of the above embodiment is read as an electrolysis cell stack, and the electricity generation unit 102 is read as an electrolysis cell unit. Moreover, the unit 110 is read as an electrolysis unit cell. However, during operation of the electrolysis cell stack, a voltage is applied between the cathode 114 and the anode 116 such that the cathode 114 serves as a positive electrode (anode) and the anode 116 serves as a negative electrode (cathode), and water vapor is supplied as a raw material gas through the communication holes 108. Electrolysis of water occurs in each of the electrolysis cell units. In this case, hydrogen gas is generated in the anode chamber 176, and the hydrogen is discharged to the outside of the electrolysis cell stack through the communication holes 108. Even in the electrolysis cell unit having the structure described above and the electrolysis cell stack having the structure described above, when the relation that the cathode-side distance sum La is smaller than the anode-side distance sum Lf is satisfied, a reduction in the performance of the electrolysis unit cell caused by insufficient spreading of the gas supplied to the cathode in the plane directions can be prevented.

DESCRIPTION OF REFERENCE NUMERALS

22: bolt, 26: insulating sheet, 27: gas passage member, 28: main body, 29: branched portion, 100: fuel cell stack, 102: fuel cell electricity generation unit, 104: end plate, 106: end plate, 107: channel through hole, 108: communication hole, 109: bolt hole, 110: unit cell, 112: electrolyte layer, 114: cathode, 116: anode, 120: separator, 121: hole, 124: bonding member, 130: cathode-side frame, 131: hole, 132: oxidant gas supply communication channel, 133: oxidant gas discharge communication channel, 134: cathode-side current collector, 135: current collector element, 140: anode-side frame, 141: hole, 142: fuel gas supply communication channel, 143: fuel gas discharge communication channel, 144: anode-side current collector, 145: electrode-facing portion, 146: interconnector-facing portion, 147: connecting portion, 149: spacer, 150: interconnector, 161: oxidant gas introduction manifold, 162: oxidant gas discharge manifold, 166: cathode chamber, 171: fuel gas introduction manifold, 172: fuel gas discharge manifold, 176: anode chamber

The invention claimed is:

1. An electrochemical reaction unit comprising:
a unit cell including an electrolyte layer containing a solid oxide and further including a cathode and an anode that face each other in a first direction with the electrolyte layer therebetween;
a cathode-side member having a cathode chamber hole that forms a cathode chamber to which the cathode is facing and that has a first inner circumferential surface and a second inner circumferential surface facing each other in a second direction orthogonal to the first direction, a cathode-side gas supply channel hole that forms a cathode-side gas supply channel through which gas to be supplied to the cathode chamber flows, a cathode-side gas discharge channel hole that forms a cathode-side gas discharge channel through which gas discharged from the cathode chamber flows, at least one cathode-side supply communication channel that is in communication with the cathode-side gas supply channel hole and has an opening at the first inner circumferential surface of the cathode chamber hole, and at least one cathode-side discharge communication channel that is in communication with the cathode-side gas discharge channel hole and has an opening at the second inner circumferential surface of the cathode chamber hole; and an anode-side member having an anode chamber hole that forms an anode chamber to which the anode is facing and that has a third inner circumferential surface and a fourth inner circumferential surface facing each other in the second direction, an anode-side gas supply channel hole that forms an anode-side gas supply channel through which gas to be supplied to the anode chamber flows, an anode-side gas discharge channel hole that forms an anode-side gas discharge channel through which gas discharged from the anode chamber flows, at least one anode-side supply communication channel that is in communication with the anode-side gas supply channel hole and has an opening at the third inner circumferential surface of the anode chamber hole, and at least one anode-side discharge communication channel that is in communication with the anode-side gas discharge channel hole and has an opening at the fourth inner circumferential surface of the anode chamber hole, wherein, in a view of the electrochemical reaction unit in the first direction, a sum La of a distance Lai between a virtual straight line connecting a midpoint of a first one of two sides of the unit cell that face each other in the second direction to a midpoint of a second one of the two sides of the unit cell and a midpoint between opposite end points of one or more cathode-side supply openings including the opening of the at least one cathode-side supply communication channel at the first inner circumferential surface and a distance Lao between the virtual straight line and a midpoint between opposite end points of one or more cathode-side discharge openings including the opening of the at least one cathode-side discharge communication channel at the second inner circumferential surface is smaller than a sum Lf of a distance Lfi between the virtual straight line and a midpoint between opposite end points of one or more anode-side supply openings including the opening of the at least one anode-side supply communication channel at the third inner circumferential surface and a distance Lfo between the virtual straight line and a midpoint between opposite end points of one or more anode-side discharge openings including the opening of the at least one anode-side discharge communication channel at the fourth inner circumferential surface, wherein, in the view of the electrochemical reaction unit in the first direction, a sum of a total opening width of the one or more cathode-side supply openings and a total opening width of the one or more cathode-side discharge openings is larger than a sum of a total opening width of the one or more anode-side supply openings and a total opening width of the one or more anode-side discharge openings, and wherein, in the view of the electrochemical reaction unit in the first direction, when a length of the unit cell on a second virtual straight line orthogonal to the virtual straight line and passing through a center of the unit cell is defined as a reference length $Lc$, a value obtained by dividing a difference between the sum $La$ and the sum $Lf$ by the reference length $Lc$, $((La-Lf)/Lc)$, is $-0.45 < (La-Lf)/Lc < 0$.

2. The electrochemical reaction unit according to claim 1, wherein the unit cell is a fuel cell unit cell.

3. The electrochemical reaction unit according to claim 1, wherein, in the view of the electrochemical reaction unit in the first direction, a sum of an area of the cathode-side gas supply channel hole and an area of the cathode-side gas discharge channel hole is larger than a sum of an area of the anode-side gas supply channel hole and an area of the anode-side gas discharge channel hole.

4. An electrochemical reaction cell stack comprising a plurality of electrochemical reaction units, wherein at least one of the plurality of electrochemical reaction units is the electrochemical reaction unit according to claim 1, and wherein the plurality of electrochemical reaction units are arranged in the first direction.

* * * * *